United States Patent
Androulaki et al.

(10) Patent No.: US 11,422,981 B2
(45) Date of Patent: Aug. 23, 2022

(54) INFORMATION MANAGEMENT AND ACCESS CONTROL IN A DATABASE

(71) Applicant: International Business Machines Corporation, Armonk, NY (US)

(72) Inventors: Elli Androulaki, Zürich (CH); Angelo De Caro, Zürich (CH); Gregory Neven, Rueschlikon (CH); Alessandro Sorniotti, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 16/379,075

(22) Filed: Apr. 9, 2019

(65) Prior Publication Data
US 2020/0327100 A1   Oct. 15, 2020

(51) Int. Cl.
| H04L 9/00 | (2022.01) |
| G06F 16/182 | (2019.01) |
| H04L 9/32 | (2006.01) |
| H04L 9/06 | (2006.01) |
| G06Q 20/38 | (2012.01) |

(52) U.S. Cl.
CPC ...... *G06F 16/1834* (2019.01); *G06F 16/1824* (2019.01); *G06Q 20/3829* (2013.01); *H04L 9/0643* (2013.01); *H04L 9/3263* (2013.01); *H04L 9/50* (2022.05)

(58) Field of Classification Search
None
See application file for complete search history.

(56) References Cited

U.S. PATENT DOCUMENTS

| 9,608,829 | B2 | 3/2017 | Spanos et al. |
| 10,373,158 | B1* | 8/2019 | James ................. G06Q 40/04 |
| 2015/0332283 | A1 | 11/2015 | Witchey |
| 2017/0155515 | A1 | 6/2017 | Androulaki et al. |
| 2017/0243212 | A1 | 8/2017 | Castinado et al. |
| 2018/0374037 | A1* | 12/2018 | Nazzari ................. G06F 21/64 |
| 2019/0361917 | A1* | 11/2019 | Tran ..................... G06Q 20/384 |

OTHER PUBLICATIONS

K. Cong, "A Blockchain Consensus Protocol with Horizontal Scalability" (2017) Retrieved from Internet using: https://infoscience.epfl.ch/record/232895/files/kcong_thesis%20%285%29.pdf.
N. Bozic et al., "Securing virtual machine orchestration with blockchains." In Cyber Security in Networking Conference (CSNet), 2017 1st, pp. 1-8. IEEE, 2017.
W. Li et al.; "Towards Scalable and Private Industrial Blockchains," BCC '17 Proceedings of the ACM Workshop on Blockchain, Cryptocurrencies and Contracts, pp. 9-14.

* cited by examiner

*Primary Examiner* — Tuankhanh D Phan

(57) ABSTRACT

An example operation may include one or more of receiving a request to create a second blockchain in a network that includes a first blockchain, sending a message to one or more validating peer nodes in the network, the one or more validating peer nodes corresponding to a subset of validating peer nodes of the network that have access to the first blockchain, the message requesting authorization for the second blockchain, analyzing responses to the message from the subset of validating peer nodes, and authorizing creation of the second blockchain based on the analyzed responses.

20 Claims, 19 Drawing Sheets

INFORMATION MANAGEMENT AND ACCESS CONTROL IN A DATABASE

TECHNICAL FIELD

This application generally relates to a database storage system, and more particularly, to information management and access control in a database.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

SUMMARY

One example embodiment provides a system that includes a first interface to access a ledger for a first blockchain in a blockchain network, the first blockchain to include or reference first data to be accessed by a plurality of validating peer nodes, a second interface to access a ledger for a second blockchain in the blockchain network, the second blockchain to include or reference second data to be accessed by a subset of the plurality of validating peer nodes that have access to the first blockchain, and a processor to perform one or more of create the second blockchain based on a message from one of the validating peer nodes in the subset, the message including information that identifies the subset of the plurality of validating peer nodes, wherein the processor is to send one or more keys to the subset of validating peer nodes, the one or more keys to allow the validating peer nodes in the subset to access the second data in the second blockchain or transmit information to append a block to the second blockchain.

Another example embodiment provides a method that includes one or more of receiving a request to create a second blockchain in a network that includes a first blockchain, sending a message to one or more validating peer nodes in the network, the one or more validating peer nodes corresponding to a subset of validating peer nodes of the network that have access to the first blockchain, the message requesting authorization for the second blockchain, analyzing responses to the message from the subset of validating peer nodes, and authorizing creation of the second blockchain based on the analyzed responses.

A further example embodiment provides a non-transitory computer readable medium comprising instructions, that when read by a processor, cause the processor to perform one or more of receive a request to create a second blockchain in a network that includes a first blockchain, send a message to one or more validating peer nodes in the network, the one or more validating peer nodes corresponding to a subset of validating peer nodes of the network that have access to the first blockchain, the message to request authorization for the second blockchain, analyze responses to the message from the subset of validating peer nodes, and authorize creation of the second blockchain based on the analyzed responses.

DETAILED DESCRIPTION

Figure 1A:
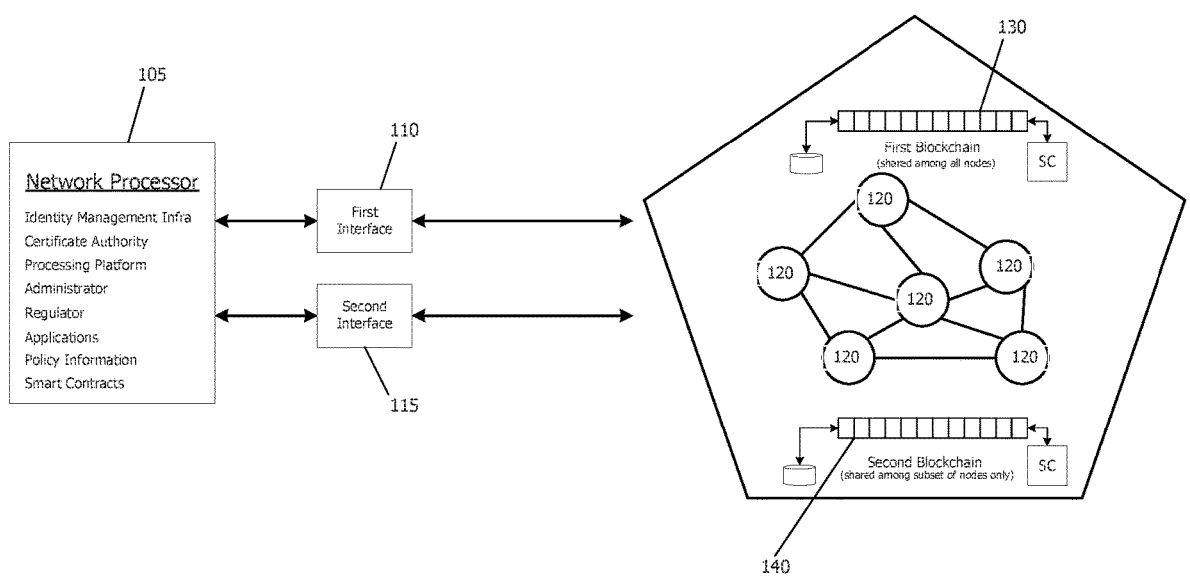
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which receive a request to create a second blockchain in a network that includes a first blockchain and then send a message requesting authorization to create the second blockchain to one or more validating peer nodes in the network. The one or more validating peer nodes correspond to a subset of validating peer nodes of the network that have access to the first blockchain. Responses to the message are analyzed and creation of the second blockchain is authorized based on the responses.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

In many blockchain networks, validating peer nodes are commonly owned by different entities, sometimes referred to as blockchain stakeholders. Some users of these networks may be assigned to one stakeholder and other users may be assigned to one or more other stakeholders. It is not uncommon for stakeholders and their users to have different interests, requirements, privacy concerns, or security levels. Nevertheless, all users in such a single blockchain network have full access to all the data stored in or referenced by the blockchain.

In some cases, a blockchain network may be partitioned in an attempt to satisfy scalability issues and meet stakeholder interests and requirements. However, care must be taken to not lose track of how many parts the network has been partitioned into. Also, complicated smart contracts may be used in an attempt to control data access. But, all too often, the smart contracts prove to be unsatisfactory for this purpose and also adversely affect efficiency.

Some benefits of the instant solutions described and depicted herein involve providing a new solution where a gap previously existed by providing a single blockchain (or blockchain network) with the capability to trigger the creation of one or more other blockchains in the same network. The single (or root) blockchain may reference data that is relevant to and accessible by all of the stakeholders, validating peer nodes, and users of the blockchain network. Each created (or sub) blockchain may reference data that is relevant to or accessible by only the stakeholders, validating peer nodes, and users assigned to that sub blockchain. The data stored in or referenced by the root blockchain may be related or unrelated to the data stored in or referenced by the one or more sub blockchains in the blockchain network. The smart contracts and policies for the sub blockchains may be similar or different from the smart contracts and policies of the root blockchain. By using a single blockchain to trigger the creation of sub blockchains, the different interests, requirements, privacy concerns, or security levels of the stakeholders and users of the root blockchain network may be adequately protected.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects and in accordance with one or more embodiments described herein, a single blockchain (or blockchain network) triggers creation of one or more second blockchains in the same network through identity management or a transaction of the first blockchain. For example, identity management may be performed according to one or more predetermined protocols performed relative to a subset of validating nodes assigned to a second blockchain. Use of transaction of the first blockchain to create a second blockchain may be performed in association with requirements embodied in one or more smart contracts or policy information.

One of the benefits of the example embodiments is that it improves the functionality of a computing system by improving the capability of the blockchain network. Through the blockchain system described herein, a computing system can manage multiple blockchains in the same network, and at the same time restrict or otherwise control access of users to at least some of the blockchains and their corresponding data. This serves to protect the interests of stakeholders which own the nodes and may have privacy or other concerns. Through the concept of shared ledgers, the blockchain system also provides a way of efficiently and securely disseminating information to different subsets of users in the network.

The example embodiments provide numerous benefits over a traditional database. For example, through the blockchain the embodiments provide a way of creating one or more second blockchains in an existing network that includes a first (or root) blockchain. Because the users/nodes of the second blockchain represent a subset of the users of the first blockchain, levels of access to different data can be efficiently and securely controlled within the same blockchain network.

Meanwhile, a traditional database could not be used to implement the example embodiments because a traditional database does not include nodes that share copies of ledgers of multiple blockchains in a same network. Accordingly, the example embodiments provide for a specific solution to a problem in the arts/field of information management and control.

FIG. 1A illustrates a logic diagram of an embodiment of a blockchain network 100 which includes a processor 105, a first interface 110, and a second interface 115. The processor 105 manages operations of the network including or relating to blockchain creation, appending of blocks to the blockchain, ledger management, key material access and distribution, trust verification, requests, messaging, validation, and consensus, as well as other operations. To perform these operations, the processor 105 may include or be coupled to one or more of an identity management infrastructure, certificate authority, processing platform, regulator, administrator, one or more applications, smart contracts, and policy information. The applications, smart contracts, and policy information are stored in one or more storage areas in or coupled to the processor 110.

The first interface 110 allows the network processor to access the ledger of a first blockchain 130 and any storage areas that store data included in or referenced by the first blockchain. Copies of the ledger (or first blockchain) are distributed for storage in or access by a peer-to-peer connection of network nodes 120, which may include but are not limited to validating peer nodes and non-validating peer nodes. The nodes themselves may be any type of active device or software. Examples include workstations, computers, mobile terminals, applications, or other devices or software that maintain or are otherwise accessible by a network address. The first interface may be a certain layer of a communication protocol, signal lines, port connections, or any other type of signal path that allows for the transmission of data.

The second interface 115 allows the network processor to access the ledger of a second blockchain 140 and any storage areas that store data included in or referenced by the second blockchain. The second blockchain 140 is in the same network as the first blockchain, but, for example, may be managed by and accessible to only subset of the nodes 120 of the first blockchain 130. Copies of the ledger (or second blockchain) are distributed for storage in or access by only the network nodes 120 in the subset. Like the first interface 110, the second interface 115 may be a certain layer of a communication protocol, signal lines, port connections, or any other type of signal path that allows for the transmission of data. In one embodiment, the first and second interfaces may be the same interface. In another embodiment, the first and second interfaces may be different from one another.

The first blockchain 130 and the second blockchain 140 are different in a number of respects. For example, the first and second blockchains may store or reference different data or different types of data, depending, for example, on the interests, requirements, privacy concerns, or security levels of users of the first and second blockchains. In one embodiment, the data stored in or referenced by the second blockchain 140 may be related to the data stored in or referenced by the first blockchain 130, e.g., the data of the second blockchain may be a more specific version of or additional data relative to the data of the first blockchain. In another embodiment, the data of the first and second blockchains may be unrelated. The types of data stored in the first and second blockchains, the identities of the nodes assigned to the second blockchains, the users who can access the blockchains, and other permissions and management operations may be determined, in part, by the interests and policies of the stakeholders which own the nodes. The specific management operations and policies may be incorporated, for example, into smart contracts that guide or control operations of the processor 105 and/or nodes 120 in relation to the blockchains.

Figure 1B:
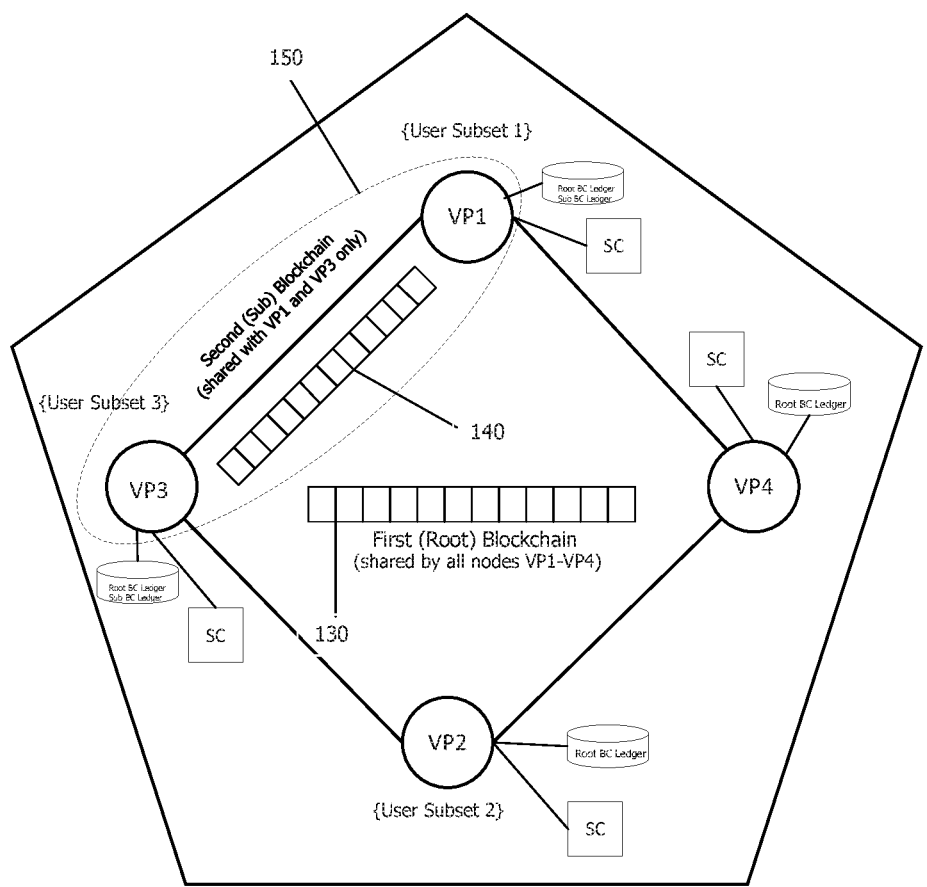
FIG. 1B illustrates a network diagram of a component operating with a database, according to example embodiments.

FIG. 1B illustrates a logic diagram 160 of the blockchain network 100 in FIG. 1A where examples of the first and second blockchains are depicted in greater detail. Referring to FIG. 1B, all of the validating peer nodes 120 may have access to the first blockchain 130. As a result, the first blockchain may be referred to as the root blockchain of the network in some embodiments. However, only a subset 150 of validating peer nodes 120 have access to the second blockchain 140. As a result, the second blockchain may be referred to a sub blockchain in some embodiments.

For illustrative purposes, only four validating peer nodes VP1-VP4 are shown in the network, and only two of these nodes VP1 and VP1 are in the subset of nodes corresponding to the second blockchain 140. A different number of validating peer nodes 120 may be included in the network and/or subset in another embodiment. The blockchain network may include other nodes, but these nodes may not perform the same operations as the validating peer nodes.

Each validating peer node 120 may be owned by a different stakeholder, or the same stakeholder may own more than one validating peer node. Also, different subsets of users may be assigned to the stakeholders or one or more users may be commonly assigned to different subsets of stakeholders. Because the stakeholders own the validating nodes, the users of the blockchain network access the root blockchain 130 through corresponding ones of the validating peer nodes VP1-VP4. Examples of subsets of users are shown as being associated with the peer nodes 120.

In the blockchain network 100, the root and sub blockchains may be created using the same processing resources and identity management infrastructure. In another embodiment, different processing resources and/or identity management infrastructures may create the blockchains. In this case, different policies and/or smart contracts may be used to create and manage the blockchains. Examples of how sub blockchain 130 is created is explained in greater detail below.

The network 100 is shown in FIG. 1B to include only one sub blockchain. In other embodiments, the blockchain network 100 may include two or more sub blockchains assigned to different subsets of validating peer nodes VP1-VP4 in the network. The validating peer nodes in the different subsets may all be different or one or more may be commonly shared among the subsets. Because the validating peer nodes assigned to the sub blockchain(s) are themselves part of the overall root blockchain network 100, each validating peer node in subset 150 may store, maintain, or otherwise have access to the ledger of the root blockchain and the ledger of its corresponding sub blockchain. Smart contracts may be read and executed by the validating peer nodes to query, append blocks to, or otherwise access data from the blockchain.

The different sub blockchains and their corresponding validating peer nodes may be determined, for example, by the different interests, requirements, privacy concerns, or security levels of the users in the blockchain network 100. As an added level of protection, different key encryption schemes may be employed to access the data stored in or referenced by each sub blockchain, and these schemes may different from the key encryption used to access the root blockchain 130 in the network. The key material for the sub blockchain 140 may be passed to the validating peer nodes (in this case, VP1 and VP3), for example, by the root blockchain 130, a network processor, a certificate authority, and/or another network entity. The blockchain network 100 and its processor, storage, management, and/or other structure features may perform the operations of the method embodiments discussed in detail below.

In one embodiment, the processor 105 creates the second blockchain 140 based on a message from a validating peer node 120 in a subset of validating peer nodes. The message may include information that identifies the subset 150 of the plurality of validating peer nodes. As will be explained in greater detail, the processor 110 may send one or more keys to the subset 50 of validating peer nodes. The one or more keys to allow the validating peer nodes VP1 and VP3 in the subset to access the data of the second blockchain 140, or the validating peer nodes VP1 and VP3 in the subset may transmit information to append a block to the second blockchain 140.

Figure 2A:
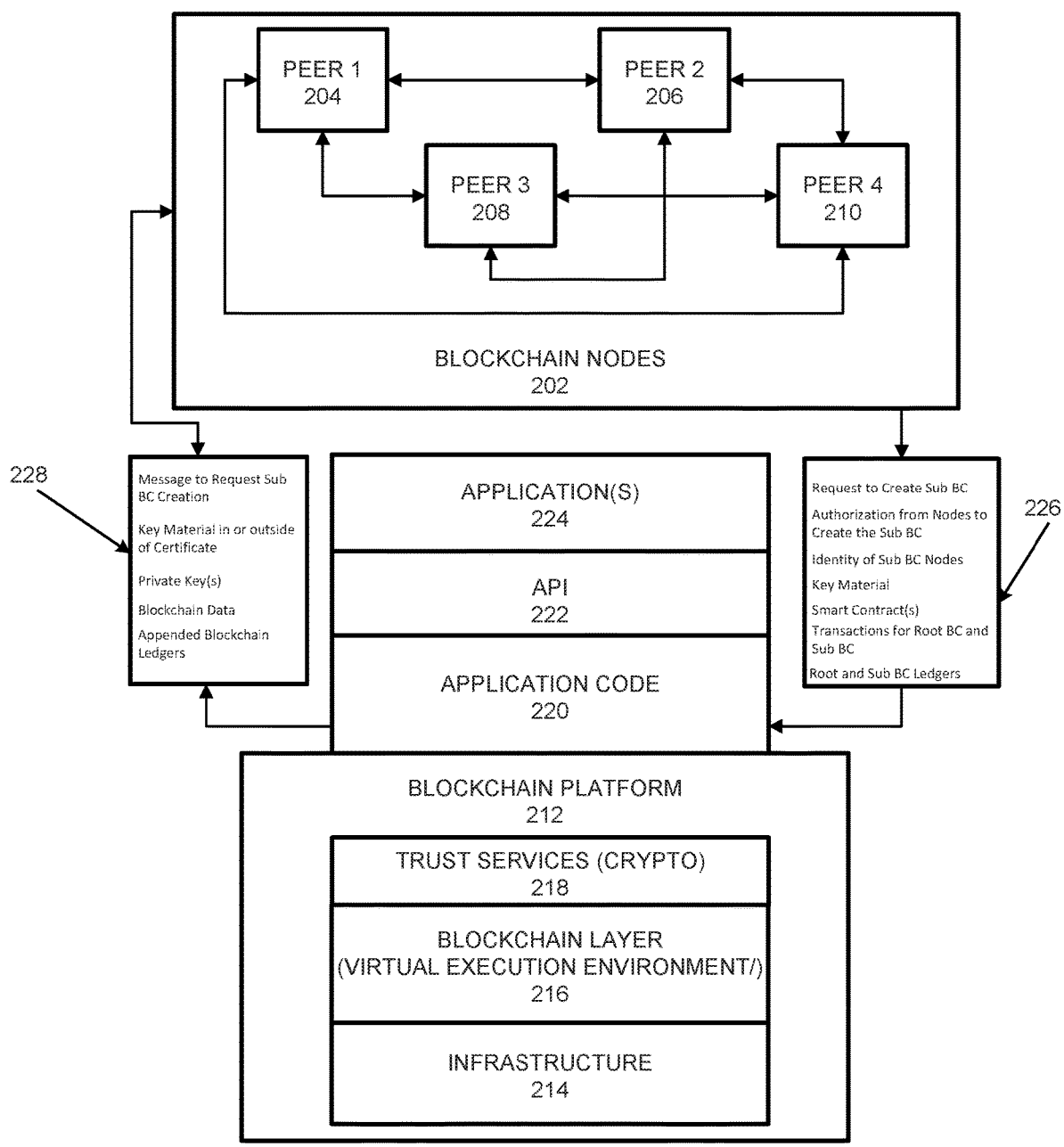
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

For example, the information 226 may include information and data associated with multiple sub blockchains in the network. For example, information 226 may include requests for creation of sub blockchains in the network, authorization from corresponding subsets of validating peer nodes for the creation of the sub blockchains, information identifying the validating peer nodes in each of the subsets, reference to one or more smart contracts including instructions on how to create the sub blockchains, key material for the sub blockchains, and ledgers for the sub blockchains. In addition, information 226 may include requests for transactions from validating peer nodes for the root and sub blockchains, after creation of the sub blockchain(s). Information 226 and associated transactions and smart contracts may be processed by one or more processing entities (e.g., virtual machines) included in the blockchain layer 216.

The result 228 of this processing may include the generation of messages in response to the request to create a new sub blockchain. The messages may be sent to validating peer nodes to be assigned to the new sub blockchain requesting authorization. Information 228 may also include key material (e.g., one or more public or private keys to be used for transmitting messages and submitting transactions in the new sub blockchain). The key material may be included within a certificate to be sent to the validating peer nodes or may be send separate from a certificate. Information 228 may include results from the execution of a smart contract associated with the root blockchain or one or more sub blockchains, including access to ledgers or data of these blockchains. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

In FIG. 2A, requests for the creation of a new sub blockchain may be received from a validating peer node as part of information 226. In response, one function may be to execute a smart contract including instructions or protocols on how to create the new sub blockchain. Another function may be to send the request to an identity management infrastructure to generate messages and information for creating the new sub blockchain. Other examples are discussed in the embodiments set forth below. Once the request or other information is processed, messages, certificates, key material, and other information associated with creation of the new sub blockchain may be included in information 228 send to one or more of the validating peer nodes 204-210.

Figure 2B:
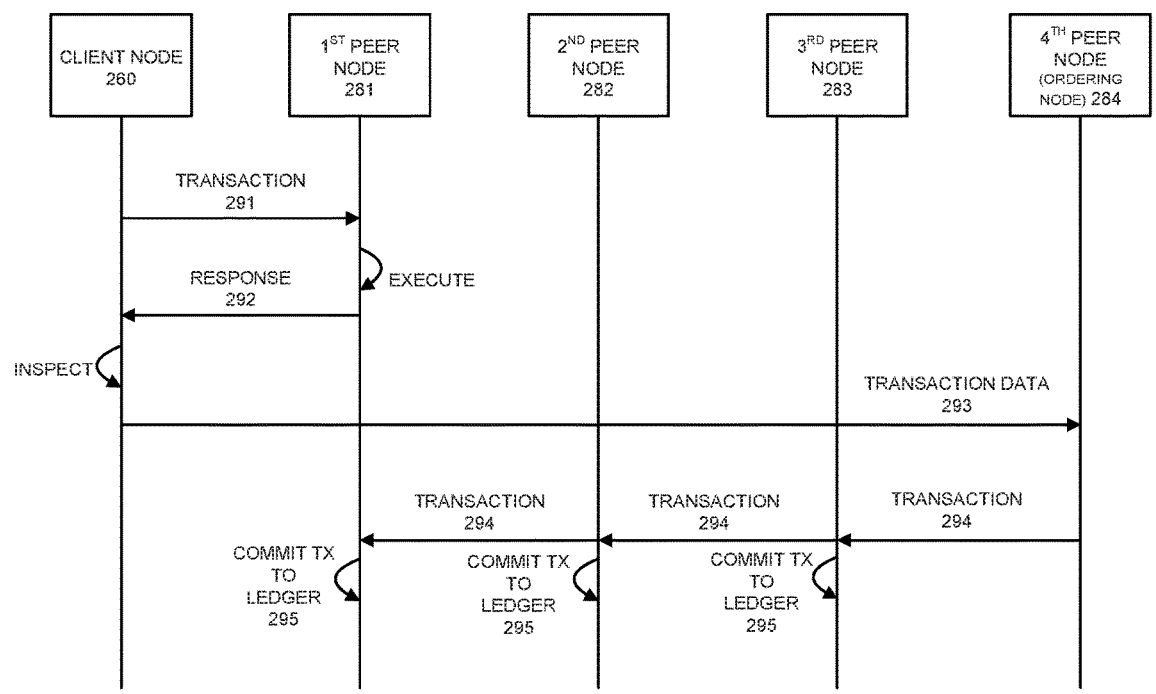
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set).

The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
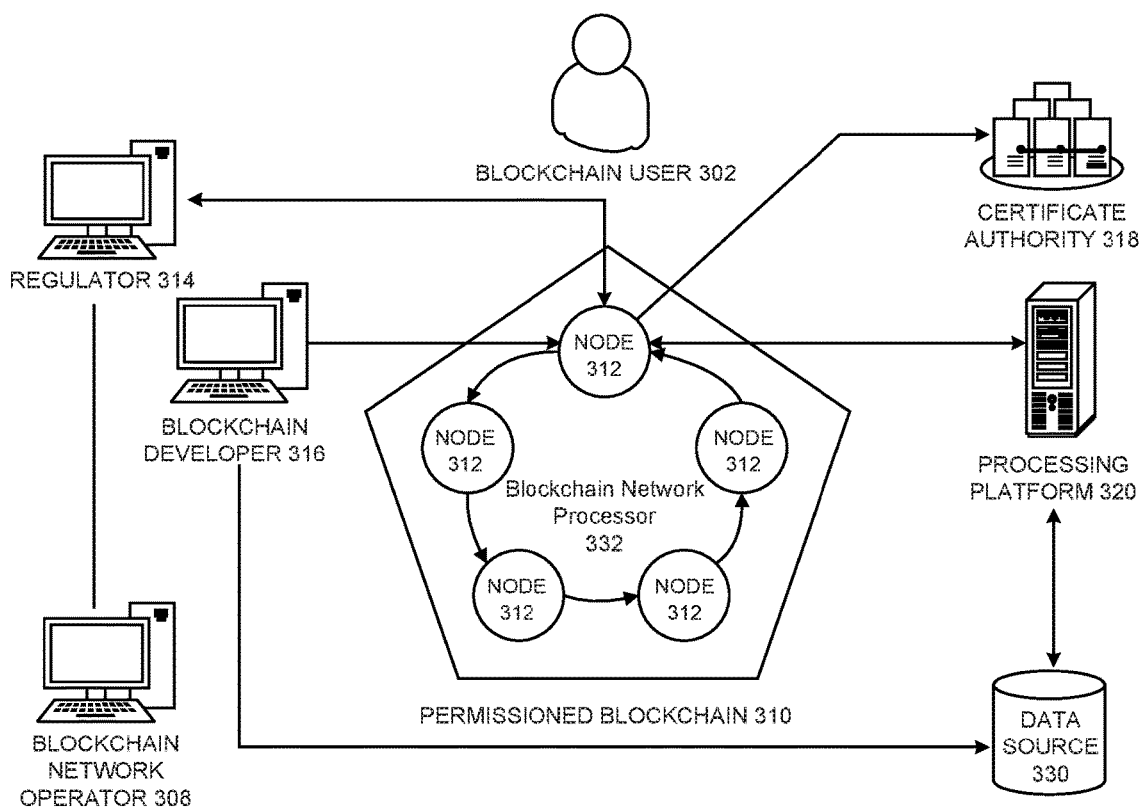
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to one or more regulator systems 314, such as auditors (the Securities and Exchange Commission in a U.S. equities market, for example). Meanwhile, a blockchain network operator system of nodes 308 manage member permissions, such as enrolling the regulator system 314 as an "auditor" and the blockchain user 302 as a "client". An auditor could be restricted only to querying the ledger, whereas a client could be authorized to deploy, invoke, and query certain types of chaincode. In accordance with one or more embodiments, the terms user and client may be used interchangeably, with the latter term corresponding, for example, to a person, workstation, computer, terminal, mobile device, application, or other entity.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the blockchain network processor 332 through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
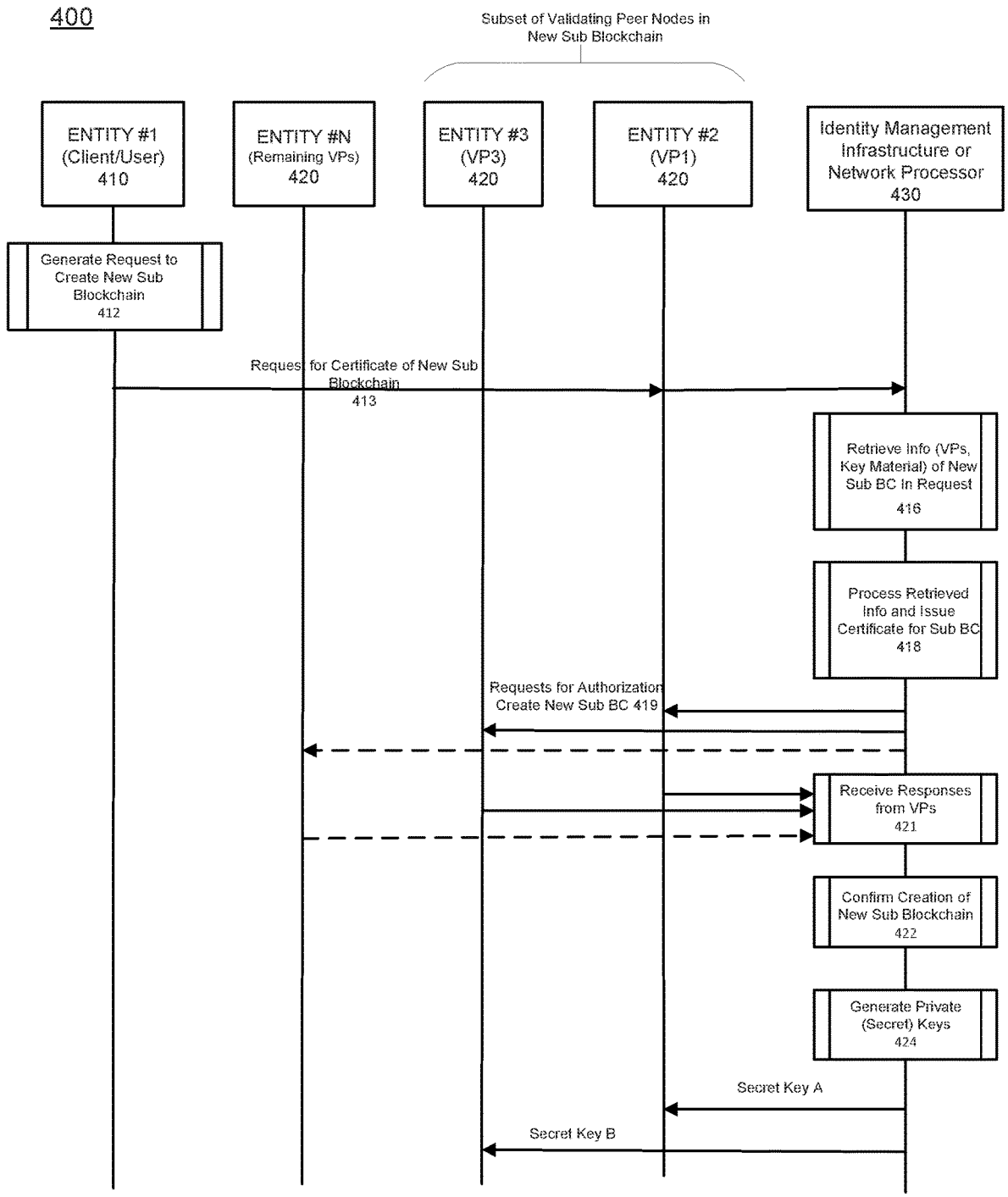
FIG. 4 illustrates a system messaging diagram, according to example embodiments.

FIG. 4 illustrates a system diagram 400 of messaging that may take place between the validating peer nodes and processing resources of the root blockchain network in triggering the creation of sub blockchain, according to one or more example embodiments.

In these example embodiments, messaging takes place between and among a client (user) 410, validating peer nodes VP1-VP4 420 as shown in FIG. 1A, and an identity management infrastructure (or identity manager) 430, which, for example may include one or more of a root blockchain processor, certificate authority, and various other management features operating according to smart contracts and/or network policies as described in example embodiments below.

Referring to FIG. 4, initially, a user determines that a new sub blockchain is to be created in the blockchain network 100. This may be accomplished, for example, as a result of an agreement with other users of the validating peer node to which the user is assigned and/or users of one or more other validating peer nodes in the network. The motivation for the new sub blockchain may be, for example, to limit access to data to only certain users of the root blockchain, which are to be named as users in the new chain.

Thus, at 412, the user (e.g., through a client application, terminal, or workstation) generates a request for the creation of a new sub blockchain. A message 413 including the request is sent to the identity management infrastructure 430 of the blockchain network through a validating peer node VP1 to which the user is assigned.

The identity management infrastructure 430 receives the message 413 and, at 416, retrieves information which the user included in the message. This information includes, for example, the identity (e.g., identifiers) of the validating peer nodes in the blockchain network that are to be assigned to the new sub blockchain. The information may also optionally include key information obtained by the user for encrypting communications among validating peers assigned to the new sub blockchain. The key information may be different from key information used in the root blockchain network and, for example, may be a public key of a public key-private key pair to be used for encryption and decryption.

At 418, the identity management infrastructure processes the information retrieved in the message and issues a certificate for the sub blockchain. Messages 419 are then sent to all of the validating peer nodes VP1-VP4 in the blockchain network requesting authorization for the creation of the new sub blockchain. In one embodiment, message 419 may only be sent to predetermined validating peer nodes which, for example, high a higher priority in the network than other validating peer nodes.

At 421, the identity management infrastructure 430 receives reply messages from the validating peer nodes that either authorize or reject the creation of the new sub blockchain. The decision to authorize or reject may be made, for example, by the users assigned to the validating peer nodes and conveyed through corresponding client applications.

At 422, when a predetermined number of authorizations have been received from the validating peer nodes, the identity management infrastructure 430 authorizes creation of the new blockchain, which may be carried out, for example, in a manner similar to the way in which the root blockchain 110 was created as described herein.

At 424, the identity management infrastructure transmits private (or secret) keys to the validating peer nodes of the newly created sub blockchain. The private keys may all be different from one another and may be used with the public key(s) to encrypt and decrypt communications with the blockchain network, for example, to query or access the sub blockchain and submit transactions to append new blocks to the sub blockchain.

Figure 5A:
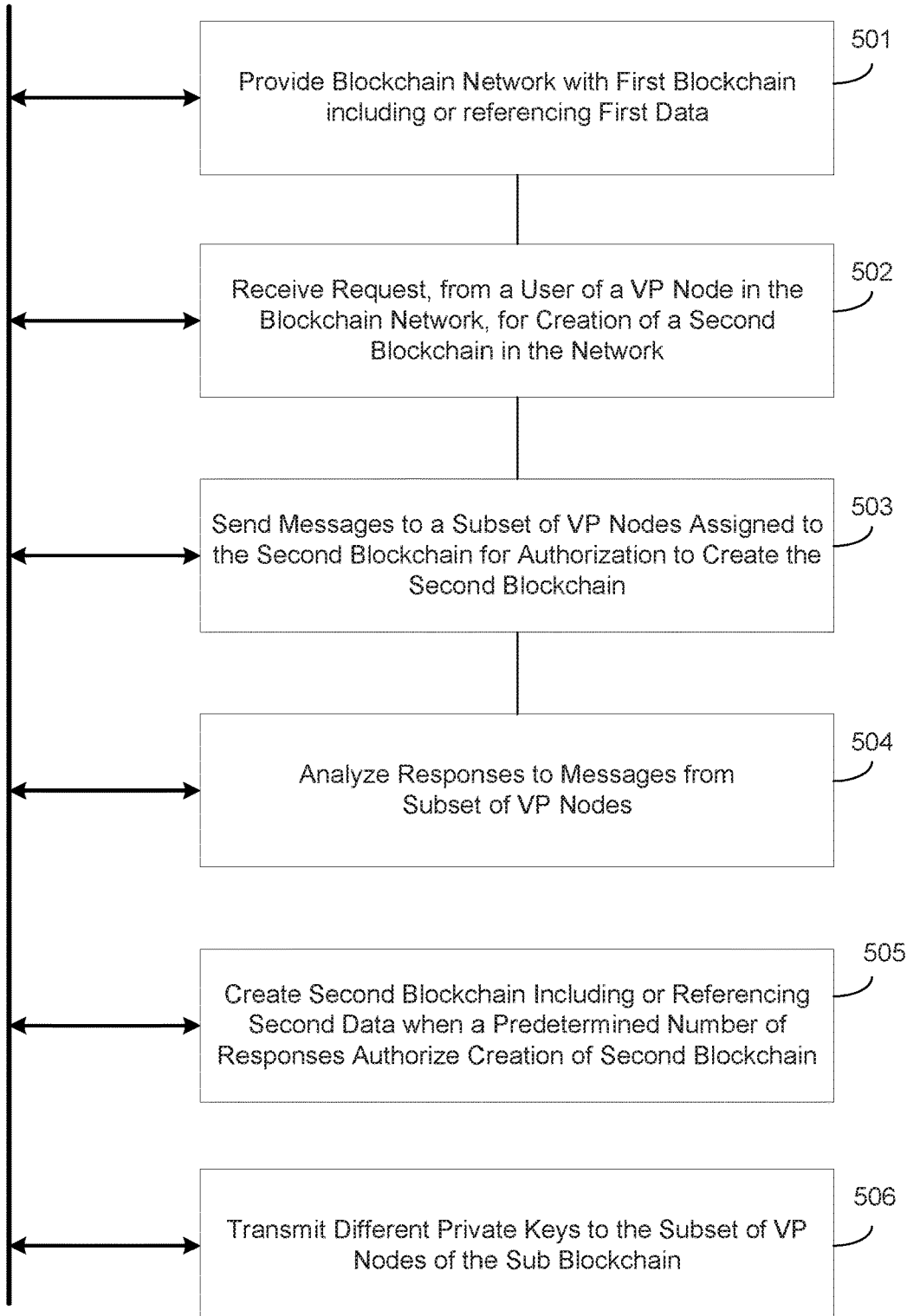
FIG. 5A illustrates a flow diagram, according to example embodiments.

FIG. 5A illustrates a flow diagram 500 of a method of using a root (or first) blockchain network to trigger the creation of one or more sub (or second) blockchains, according to example embodiments. The root blockchain is managed by a root blockchain network that includes a plurality of validating peer nodes, for example, as described with reference to FIGS. 1-4.

Each validating peer node may be owned by one or more entities (or blockchain stakeholders), and users in the root blockchain network are assigned to one or more of the stakeholders. Thus, designation of validating peer nodes for each sub blockchain may also effectively indicate the users assigned to each sub blockchain.

The root blockchain network may be a permissioned network, e.g., only some of the peer nodes in the root blockchain network validate and execute transactions, are involved in consensus, and perform other management operations. Other peer nodes may not be permissioned to perform these operations, as determined, for example, by one or more policies, protocols, and/or smart contracts of the root blockchain network.

Referring to FIG. 5A, the method 500 may initially include, at 501, providing a blockchain network including a first blockchain. The first blockchain may store or reference first data. If the first blockchain references the first data, the first data may be stored, for example, in data source 330 (e.g., FIG. 3) or in another storage area. The first data may include, for example, any type of data of interest to the validating peer nodes of the network, as defined, for example, by one or more smart contracts. In one embodiment, the first blockchain may also store data and information relating to one or more second blockchains created in the blockchain network.

At 502, a request is received to create a second blockchain in the blockchain network that includes the first blockchain. The request may be sent by a client of the blockchain network and may be received (by the blockchain network processor, an identity management infrastructure, a certificate authority, processing platform, or other processing resource) through one of the validating peer nodes. As previously noted, in accordance with one or more embodiments, the first blockchain may be referred to as a root blockchain and the second blockchain may be a sub blockchain as previously described. The client may be a user, node, application, computer, workstation, mobile terminal, or server included in or connected to the blockchain network. In accordance with one or more embodiments, "user" and "client" may be used interchangeably.

At 503, the blockchain network processor, or other managing application or network device, may, for example, in accordance with the instructions in a smart contract, sends a message requesting validating peer nodes in the blockchain network for authorization to create the requested sub blockchain. The validating peer nodes represent a subset of all the validating peer nodes in the blockchain network, e.g., are ones assigned to the sub blockchain as indicated in the creation request in 502. The validating peer nodes may be identified, for example, in the request of 502. The same request may include other information, including but not limited to key information.

At 504, responses from the subset of validating peer nodes that were sent the request in 503 are analyzed to determine whether the sub blockchain should be created. The conditions under which the responses are analyzed may be determined, for example, by a smart contract or policy defined for the sub blockchain, which may or may not be different from smart contracts used for the root blockchain. For example, the number of favorable responses to authorize creation of the sub blockchain may be compared to a predetermined number, and the decision as to whether to create the sub blockchain may be made based on the result of the comparison. In other embodiments, different criteria may be used to analyze the responses from the subset of validating peer nodes for purposes of determining whether the sub blockchain is to be created.

At 505, when the criteria in 504 is satisfied, the blockchain network processor, or other managing application or network device, may create the sub blockchain. The sub blockchain may be created based on instructions in a smart contract defined for the sub blockchain, which, for example, may be included in or referenced by the request of 502. The sub blockchain may reference second data, which, for example, may be related or unrelated to the first data of the root blockchain but which has significance to the subset of validating peer nodes and their attendant users of the sub blockchain.

At 506, the blockchain processor, or other managing application or network device, may distribute key material to the subset of validating peer nodes assigned to the sub blockchain. The key material may be either one or both keys of a public key-private key pair used to encrypt information, transactions, data, etc., associated with the sub blockchain. In one embodiment, the public key for the sub blockchain (within or outside of a certificate) may be distributed to the subset of validating peer nodes prior to creation of the sub blockchain and different respective private (or secret) keys may be distributed to respective ones of the subset of validating peer nodes after creation of the sub blockchain.

Figure 5B:
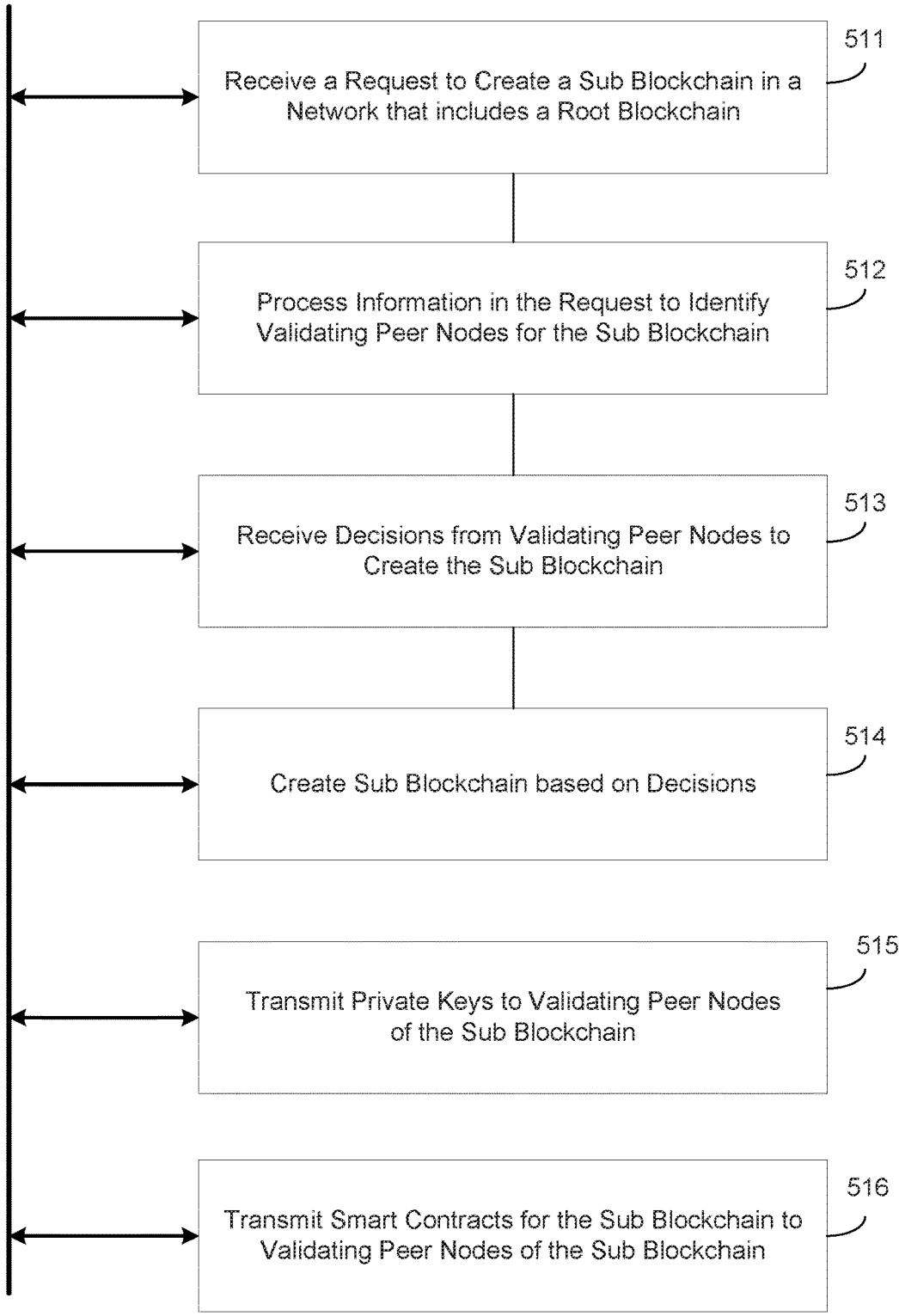
FIG. 5B illustrates a further flow diagram, according to example embodiments.

FIG. 5B illustrates a flow diagram of another embodiment of a method 510 of using a root blockchain network to trigger the creation of one or more sub blockchains. This embodiment may, for example, be a more specific implementation of the method of FIG. 5A and may be understood with reference to FIG. 4.

Referring to FIG. 5B, the method 510 may initially include, at 511, receiving a request to create a sub blockchain in a network that includes a root blockchain. The request may be received from a user through a validating peer node of the blockchain network. An identity management infrastructure (or identity manager) of the network may receive and process the request. The identity management infrastructure may be assimilated to a PKI (Public-Key Infrastructure) where one or more Certification Authorities (CAs) certify users' public keys. After certification the user receives a "client" certificate that can be used to assemble blockchain transactions. In one embodiment, the identity management infrastructure may be enhanced to allow control for the creation of chains.

The request may include various types of information that allow for creation of the sub blockchain. This information may identify, for example, the validating peer nodes in the blockchain network that are to be assigned to the sub blockchain. The validating peer nodes may be identified, for example, by metadata including a pre-assigned identifier. The information may also indicate the status of each of the identifier peer nodes, e.g., whether the nodes are active or closed.

The information in the request may also include one or more of two keys of a key pair to be used by the validating peer nodes to encrypt and decrypt data and messages in the network in relation to the sub blockchain. The key pair may be a public key-private key pair, and the information in the request may include, for example, only the public key. The public key of the sub blockchain may or may not be distributed to the validating peer nodes in the network that are not assigned to the sub blockchain. In one embodiment, the status of the nodes and/or the key information for the sub blockchain may be obtained by the identity management structure from sources other than the request, e.g., network processor, certificate authority, management node, smart contract, etc.

At 512, the information in the request is processed to identify one or more validating peer nodes to be assigned to the second blockchain. This may include, for example, accessing one or more fields of a packet used to transmit the request. The specific manner of submitting requests may be defined, for example, by policy information or a smart contract of the blockchain network. The one or more validating peer nodes to be assigned to the sub blockchain constitute a subset of validating peer nodes of the network that already have access to the root blockchain. In one embodiment, only one validating peer node may be assigned to the sub blockchain. In another embodiment, more than one but less than all validating peer nodes may be assigned to the sub blockchain. In this case, the validating peer nodes may be owned by the same blockchain stakeholder or by different stakeholders.

At 513, a number of validating peer nodes are requested to provide a decision regarding whether or not the new sub blockchain is to be created. The validating peer nodes may be all validating peer nodes in the network, only the ones assigned to the sub blockchain, ones not assigned to the sub blockchain, or another combination of validating peer nodes. The validating peer nodes requested to provide a decision may be defined, for example, by network policy or a smart contract. When requested, the validating peer nodes transmit their decisions back to the identity management infrastructure.

At 514, the identity management infrastructure authorizes, or does not authorize, creation of the second blockchain based on the decisions from the one or more validating peer nodes. In one embodiment, creation of the sub blockchain may be performed when a predetermined number of the validating peer nodes provide a favorable authorization, e.g., through transmission of an acknowledgment signal. The predetermined number may be all or less than all of the nodes.

At 515, after creation of the sub blockchain is authorized, the identity management infrastructure may transmit different private (or secret) keys to corresponding ones of the validating peer nodes assigned to the sub blockchain. The validating peer nodes of the network that are not assigned to the sub blockchain may be excluded from receiving private keys to the sub blockchain, and therefore may not submit transactions to the sub blockchain or even access information stored in or referenced by the sub blockchain. In one embodiment, the same is not true of the nodes of the sub blockchain, e.g., users of the nodes of the sub blockchain may access information from and submit transactions to the root blockchain. Thus, the root and sub blockchains may store different data for users that have different interests or levels of access. The private keys may be transmitted to the validating peer nodes of the sub blockchain before or after the sub blockchain is actually created by the network.

At 516, when the sub blockchain is authorized for creation, the identity management infrastructure may distribute, or arrange for the distribution of, policy information and/or a smart contract to the validating peer nodes of the sub blockchain. The smart contract or policy information may provide instructions, for example, on how transactions are to be submitted to the sub blockchain and/or how messages and information are to be disseminated among the peer nodes of the sub blockchain or between the nodes of the sub blockchain and other nodes in the blockchain network.

After the sub blockchain has been created, the identity management infrastructure may perform a number of additional operations. These operations include, for example, listing user transactions (assuming proper credentials have been acquired) from the sub blockchain. In one embodiment, if more than one sub blockchain has been created in the blockchain network, user transactions from the sub blockchains may also be listed. Another operation may include maintaining status information on each of the sub blockchains, e.g., a hash of the ni-th block of that chain, where ni=i*k, k is an integer, and k≥1, a prefixed monitoring block-size.

Figure 5C:
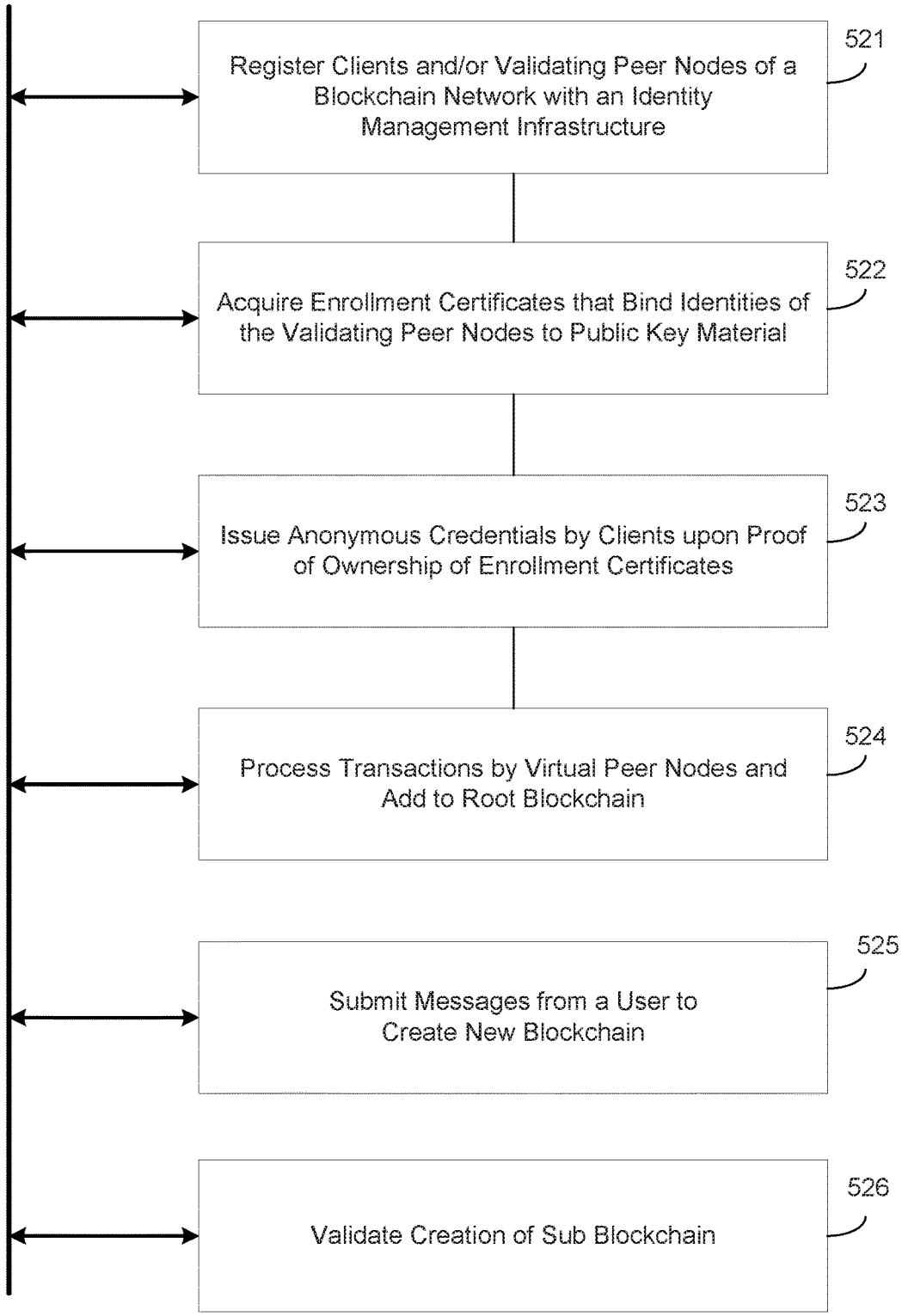
FIG. 5C illustrates a further flow diagram, according to example embodiments.

FIG. 5C shows another embodiment of a method 520 of using a root blockchain network to trigger the creation of one or more sub blockchains. In an initial operation of the method, at 521, clients and validating peer nodes register with a designated identity management infrastructure. The clients may be, for example, computers, workstations, mobile terminals, or applications accessed by users to submit transactions and other information to the blockchain network. The validating peer nodes execute and validate the transactions submitted by the clients.

At 522, after the clients and validating peer nodes have been registered, the clients and validating peer nodes acquire enrollment certificates that bind the identities of the validating peer nodes (and their respective users) to public key material (e.g., encryption and signature keys).

At 523, clients are given the option of issuing anonymous credentials upon successful proof of ownership of an enrollment certificate. Transactions that are submitted by clients will be signed by corresponding client certificates, which, for example, may be anonymous or may indicate client identities.

At 524, upon submission, transactions are processed by validating peer nodes of corresponding clients. The processing involves validating the signatures of the clients, reading the content of the transactions, and executing the code within. Properly executed transactions are added by the validating peer nodes to the ledger of the root blockchain. As previously indicated, all of the validating peer nodes are part of what is considered to be the blockchain network.

At 525, in the blockchain network, one or more users submit corresponding messages through one or more client(s) to create a new sub blockchain. At this point, one or more sub blockchains may already have been created in the network or this might be the first sub blockchain requested. The messages may include, for example, information identifying the validating peer node(s) associated with the new sub blockchain and information indicating the key distribution for the new sub blockchain.

At 526, when validated, the messages (or transactions) trigger the creation of the new sub blockchain. Validation may be performed as previously described, e.g., authorization by a predetermined number of validating peer nodes assigned to the sub blockchain to be created.

Creation of the new sub blockchain may be triggered in two ways: (1) through the identity management infrastructure or (2) through a blockchain transaction.

Identity Management Infrastructure

Figure 5D:
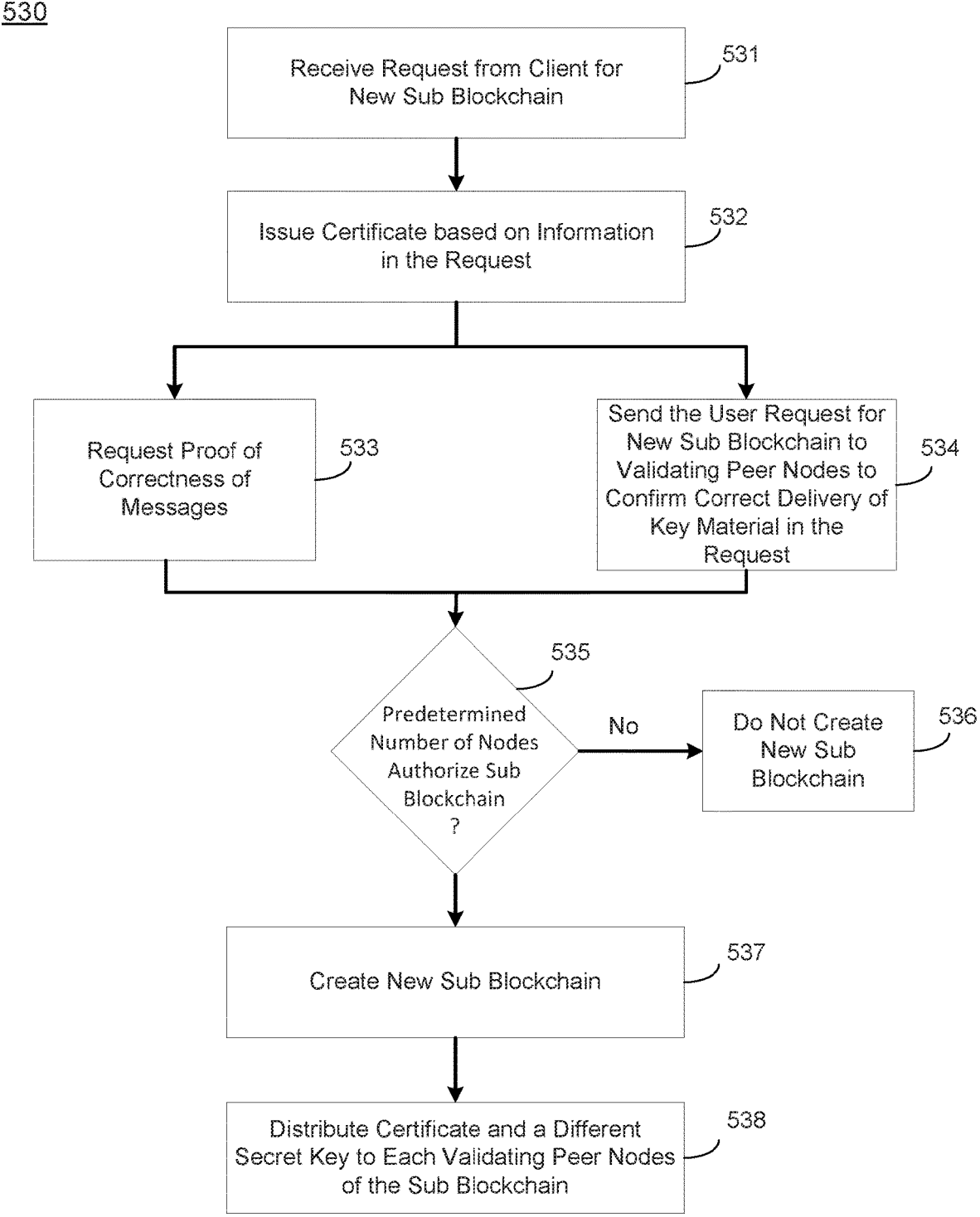
FIG. 5D illustrates a further flow diagram, according to example embodiments.

FIG. 5D shows an embodiment of a method 530 to trigger the creation of a sub blockchain through an identity management infrastructure (or identity manager) of the blockchain network. In an initial operation 531, a user (or client) of the blockchain network generates a request to issue a certificate for a new sub blockchain. The user may be an existing user or a one newly added to the blockchain network. In this embodiment, the request is sent through a corresponding peer node to the blockchain network, where it is received by the identity management infrastructure.

The request may include various types of information. For example, the request may include information (e.g., metadata identifiers) that identifies one or more clients and/or validating peer nodes that are to be assigned to the sub blockchain. The user may designate this information in the request, for example, using a client application. In one case, the request may be signed with the requestor/user's long-term signing key, and transmitted through the network by a validating peer node.

The request may also include information indicative of the status of each of the validating peer nodes to be assigned to the sub blockchain. The status of the nodes may be, for example, active, closed, or another state.

The request may also include information that identifies key material to be assigned to the sub blockchain. For example, a user may generate an encryption key pair for the new sub blockchain. The encryption key pair may include a public key and a private (or secret) key. The public key may be provided to the identity management infrastructure in the request, along with the information that identifies the validating peer nodes to be assigned to the sub blockchain.

The user may also generate or obtain ciphertexts of different secret keys for respective ones of the validating peer nodes assigned to the sub blockchain. The ciphertexts may be included, for example, in the request.

At 532, the identity management infrastructure processes the request and issues a certificate for the new sub blockchain based on information in the request. In one embodiment, the chain certificate may a unique identifier, the identities of the validators, and a public key to send encrypted messages to the validators.

The identity management infrastructure may also perform one or more confirmation operations prior to authorizing creation of the sub blockchain. For example, consider the case where users of the blockchain network have different trust assumptions, for example, as determined by the certificate authority, policies, smart contracts, or other information associated with the blockchain network. Depending on the trust assumption of the user requesting the new sub blockchain, the identity management infrastructure may (i) request, at 533, the user to provide a proof of correctness of messages to be submitted in association with the sub blockchain (e.g., a zero knowledge proof of equality of plaintexts to all validating peer nodes of the sub blockchain) or (ii) send, at 534, the user request for the sub blockchain to all associated validating peer nodes and confirm correct delivery of the key material (included in the request) with these nodes.

At 535, the identity management infrastructure may send a request to validating peer nodes in the network to authorize creation of the sub blockchain. In this case, the total number of validating peer nodes included in specifications of the sub blockchain may receive the request to authorize or only predetermined (e.g., higher priority) validating peers may receive the request.

The identity management infrastructure receives responses to the request sent to the validating peer nodes in 535. If, for example, a predetermined number of the validating peer nodes do not authorize creation of the sub blockchain, then, at 536, then the sub blockchain is not created. If a predetermined number of validating peer nodes authorize creation of the sub blockchain, then, at 537, the identity management infrastructure creates the sub blockchain. The predetermined number may be all, a majority, or some other number of validating peer nodes. In one embodiment, the predetermined number of responses is a minimum of 2f+1 positive responses authorizing creation of the sub blockchain, where f is the number of byzantine nodes.

At 538, once the sub blockchain is created, the identity management infrastructure may distribute the different secret keys (e.g., corresponding to the ciphertexts generated by the user and included in the creation request) to corresponding ones of the validating peer nodes assigned to the sub blockchain. Using the secret keys, the nodes may perform decryption with respect to messages and information associated with the sub blockchain.

The method of FIG. 5D may be modified or include various optional steps in accordance with one or more embodiments. For example, the key material information for the sub blockchain may not be included in the creation request. In this case, the identity management infrastructure may generate a public key-private key pair for the new sub blockchain and add the corresponding public key to the certificate for the sub blockchain. The identity management infrastructure may also include in the certificate one or more messages to the validating peer nodes of the sub blockchain. An example of the messages includes ciphertexts of the secret keys for respective ones of the validating peer nodes of the sub blockchain. The secret keys may be produced, for example, based on long-term encryption keys of the validating peer nodes of the sub blockchain. Including this type of message in the certificate allows the validating peer nodes to perform decryption for the sub blockchain based on their secret keys.

In one embodiment, after receiving a request for a sub blockchain, the identity management infrastructure may provide the key material to validating peer nodes separately, e.g., not in the certificate. In this case, the identity management infrastructure may issue the certificate if and only if all the validating peer nodes assigned to the sub blockchain have acknowledged correct delivery of a corresponding key, e.g., one of the keys of the key pair. Depending on the policy regarding the keys, the identity management infrastructure may or may not provide the secret key to users assigned to the sub blockchain. If the secret key is not provided to users, and the identity management infrastructure is not trusted to have performed its job properly, users may request a proof of correct construction of the certificate for the sub blockchain.

Once the sub blockchain is authorized for creation, certificates may be routed to all validating peer nodes of the entire blockchain network (which includes the validating peers of the new sub blockchain), so that all users of the blockchain network are informed about the existence of the sub blockchain.

Blockchain Transaction

Figure 5E:
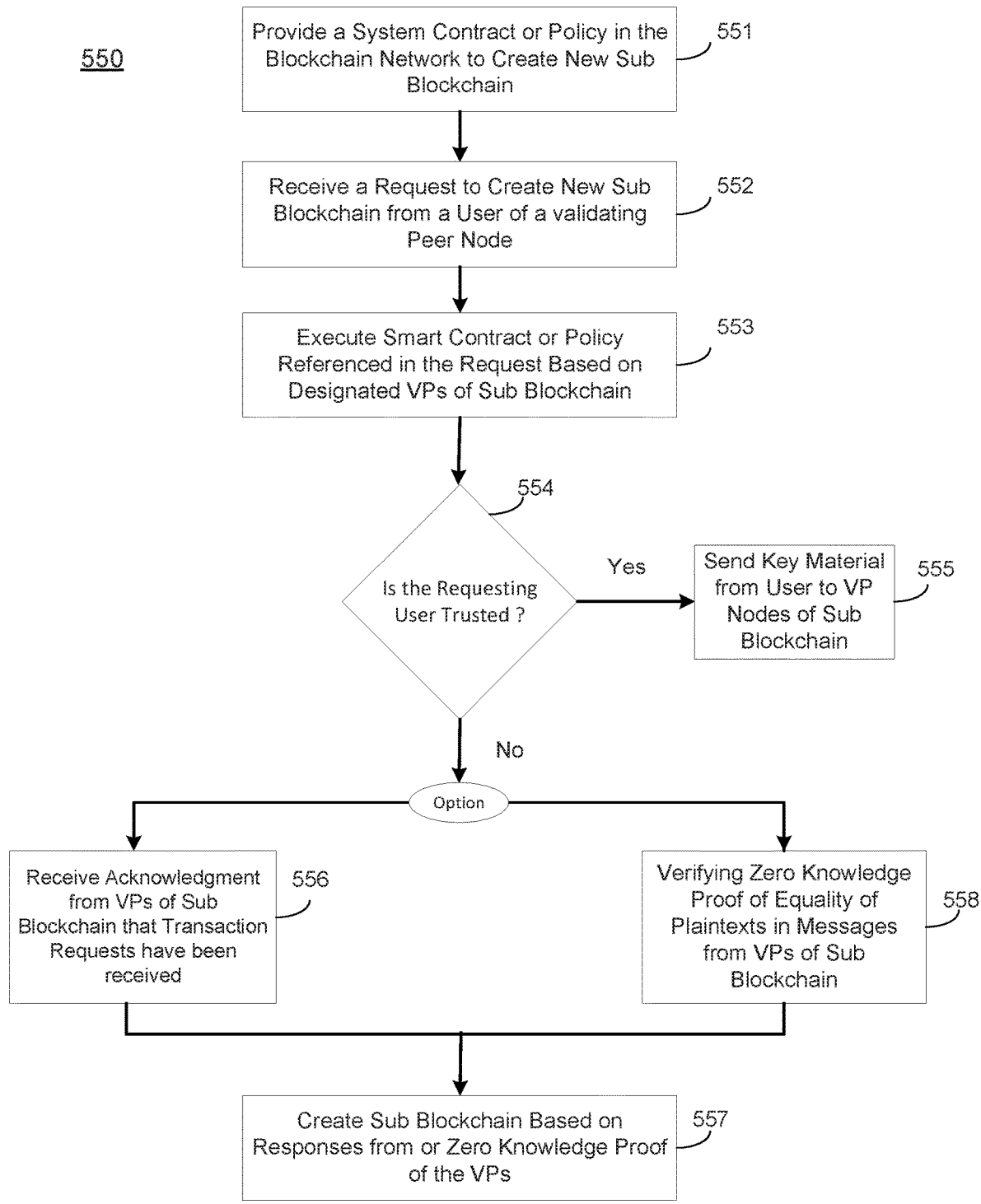
FIG. 5E illustrates a further flow diagram, according to example embodiments.

FIG. 5E shows an embodiment of a method 550 to trigger the creation of a sub blockchain through a blockchain transaction in the root network. The method includes, at 551, providing a system contract or policy that provides instructions on how new sub blockchains are to be created. The system contract may, for example, specify the set of users and/or administrators authorized to generate new sub blockchains (e.g., based on the certificates of these users) in the blockchain network and metadata to be used in processing requests for the creation of the sub blockchains.

At 552, a request for the creation of a new sub blockchain is received from a user assigned to a validating peer node in the root blockchain network. The request may include various types of information, including but not limited to a reference to the smart contract or policy to create new sub blockchains.

At 553, the smart contract referenced in the request is executed. In one embodiment, the request is in the form of, or invokes, a transaction which references the system contract or policy that controls creation of the sub blockchain. The transaction, or request, may include information identifying the subset of validating peer nodes in the blockchain network (as indicated in the request) that are to be assigned to the sub blockchain and which are to validate contracts for the sub blockchain. The transaction, or request, may also include other information, including but not limited to information indicating the terms for distributing key material to the validating peer nodes of the sub blockchain.

A system contract may handle generation of new chains. In one embodiment, an authorized user invokes a system contract by assembling a transaction including an invocation to the "createChain" method of the contract based on parameters for creating a new chain, e.g., a unique identifier, the identities of the validators, and a public key to send encrypted messages to the validators.

Referring again to FIG. 5E, at 554, a determination is made as to whether the user requesting creation of the sub blockchain is trusted to pass key material to the validating peer nodes of the sub blockchain. This determination may be made, for example, by accessing certificate or trust assumption information relating to the requesting user. If the requesting user is trusted, then, at 555, the user sends key material (e.g., one or both keys of a public key-private key pair) to each validating peer node assigned to the sub blockchain. The private key of the pair may be different for different nodes and/or sub blockchain users.

If the user requesting creation of the sub blockchain is not trusted to pass the key material to the validating peer nodes assigned to the sub blockchain, one of the following two approaches may be taken in order for creation of the new sub blockchain to be committed.

At 556, the first approach includes receiving acknowledgments from the validating peer nodes assigned to the sub blockchain that the transaction, or request, has been received though the blockchain network. At 557, the sub blockchain may be created and placed in an active state when responses from a predetermined number of validating peer nodes assigned to the sub blockchain are received. The predetermined number may be all of the validating peer nodes assigned to the sub blockchain or another number of these nodes.

At 558, the second approach involves verifying zero knowledge proof of equality of plaintexts in messages received from the validating peer nodes assigned to the sub blockchain. In one embodiment, the zero knowledge proof may be part of the transaction request. Once the zero knowledge proof from the validating peer nodes is verified, then, at 557, the sub blockchain may be created and placed in an active state within the root blockchain network.

In these and other embodiments described herein, while the created sub blockchain may have different smart contracts and policies from the root blockchain and may be accessed by only a subset of network validating peer nodes, the same network processor, certificate authority, processing platform, and other processing resources (e.g., as described in FIGS. 1-4) may be used to execute transactions and otherwise manage all operations related to the sub blockchain.

In addition to the aforementioned features, the system contract that controls generation of the sub blockchain may specify how the validating peer nodes assigned to the sub blockchain are to agree on a new chain-key. In one embodiment, this is performed in a such a way that the user requesting the new sub blockchain does not learn the chain secret (decryption) key. Activation of the new sub blockchain may be enabled when, for example, a predetermined number of validating peer nodes assigned to the sub blockchain submit a valid response or contribution on the key material. The predetermined number may be, for example, 2f+1 out of 3f+1 validating peer nodes, where f corresponds to a number of byzantine nodes.

In one or more embodiments, the blockchain network processor may append a block to the first blockchain in the network recording that the sub blockchain has been created. This operation may be performed in accordance with a smart contract of the blockchain network associated with the first blockchain. The appended block may store or reference various types of information relating to the sub blockchain. This information may, for example, identify the validating peer nodes of the sub blockchain, but may exclude key material for the sub blockchain because the validating peer nodes in the network that are not assigned to the sub blockchain are not permitted to access or perform any other translation in relation to the sub blockchain.

According to one example, a transaction may notify validating peer nodes assigned to the new sub blockchain of the requirement to agree on a chain-key. In this case, each VP involved in the new chain may call methods exposed by the system contract (e.g., which may be done by issuing a transaction.)

One example of a system contract that may be used to control the creation of a new sub blockchain specifies the following operations.

1) createChain(cID, {VPs}, {VP-msgs}), where VPs correspond to the validating peer nodes assigned to the sub blockchain, cID correspond to an identifier of the sub blockchain, and {VPs}/{VP-msgs} correspond to the set of VPs responsible for the sub blockchain and the messages passed to them (e.g., encrypted key material).

2) agreeChainKey(cID, VP-msg-rsp), through which a VP can provide its response VP-msg-rsp with respect to {VP-msgs}. If a key-agreement is required among the sub blockchain VPs, validators (e.g., clients, validating peer nodes, or both) may include their responses or contributions within VP-msg-rsp.

3) commitChainKey(cID, VP-msg-cmt), through which a VP can provide its response or contribution to the key agreement of the sub blockchain that results in the new key being established.

In one embodiment, the createChain operation may be accompanied by an invocation access control list denoting the list users authorized to create the sub blockchain. The list may be designated by a system or smart contract of the blockchain network. The agreeChainKey operation may only be invokable by the VPs corresponding to chain cID. The commitChainKey operation may only be required, for example, when validators are to agree with themselves on the key material of the sub blockchain.

An example of a request to create a sub blockchain may include the fields below. A transaction corresponding to the request may be signed by the user requesting the sub blockchain.

a field specifying an identifier (e.g., cID) of the sub blockchain to be created a field specifying a list of validators (e.g., validating peer nodes in the blockchain network, clients, or both) to be assigned to the sub blockchain, e.g., $\{vi\}i=1,m$ with public encryption keys $\{pkvi\}i=1,m$ a field (optional) specifying a list of messages to validators of the sub blockchain the certificate and signature of the sub blockchain requestor An example for achieving key agreement among validators may include the following operation(s) when a request for a new sub blockchain is received: createChain(cID, {VPs}, {VP-msgs}) chain-validators are requested to process (among others) VP-msgs.

Two situations may arise in this case.

First, the policy for the root blockchain may require a key to be provided by the creator (e.g., requesting user or validating peer node) of the sub blockchain. In this case, messages to validating peer nodes may include ciphertexts of the key material (e.g., public and/or private) key of the sub blockchain. In one embodiment, each validator may only need to decrypt the ciphertext that corresponds to that validator, and may invoke an 'agreeChainKey' operation with VP-msg-rsp set to 'valid' or 'invalid' if the sub blockchain was not properly created. In one example, assuming f byzantine nodes and a malicious creator, 2f+1 responses are requested in the set of at least 3f+1 chain validating peer nodes.

In one or more embodiments, the policy of the root blockchain network may require that a key is agreed upon among validators of the sub blockchain. According to one example, for vi VP-msg-rsp, let it be VP-msg-rspi can be a commitment to its contribution, e.g., VP-msg-rspi=Commit (contribi), where Commit is a properly hiding and binding commitment scheme and where contribi<-hash(vi, nci). In this latter expression, predetermined hash function may be chosen and nci may be a number picked randomly by vi from a proper group.

After 2f+1 responses have registered to the blockchain network from distinct validators of the sub blockchain, chain-validators may 'commit' their responses or contributions to the chain key by invoking commitChainKey(cID, VP-msg-cmt). In this expression, VP-msg-cmt of validator vi (denoted by VP-msg-cmti) corresponds to a ciphertext of message Mi generated using multi-cas encryption to the validators of cID, e.g., VP-msg-cmti<-MultiEnc[{pkvi}i=1, m; re; Mi], where re is the randomness contributed in this multi-cas encryption and Mi contains the following items:

the opening of the commitment value of VP-msg-rspi, the preimage of contribi, e.g., nci.

the randomness re used in this multi-cas encryption ciphertext.

Upon receiving these items, each validator in $\{vi\}$ i=1 . . . m may evaluate the correctness of VP-msg-cmt. If the same message has been passed to all validators of the sub blockchain, then the key material for the sub blockchain may be computed by the frs f+1 valid 'commitChainKey'-responses that appear in the root blockchain, which may be, for example, a function of the randomness nci associated with each response. The chain is activated if a predetermined number (e.g., f+1 or more) valid responses appear in the root blockchain (assuming that there are 2f+1 or more chain-validators).

One type of encryption that may be used is ElGamal encryption. This is an asymmetric key encryption for public-key cryptography which is based on the Diffie-Hellman key exchange. ElGamal encryption in the context of one or more embodiments disclosed in this application may be performed as follows. Let G be a cyclic group of prime order q with generator g. The ElGamal encryption scheme over G works as follows. The secret decryption key is a random exponent x in $Z\_q$, while the public key is $y=g^x$. To encrypt a message m that is an element of G, one chooses a random r in $Z\_q$ and computes a ciphertext $C=(g^r, y^r*m)$. To decrypt a ciphertext $C=(C\_1, C\_2)$, one recovers $m=C\_2/C\_1^x$.

In accordance with embodiments disclosed herein, there are several ways to use ElGamal encryption in a mode so that the randomness r is recovered during decryption. One example is the Fujisaki-Okamoto transformation, which encrypts a message m by choosing a random group element s, computing $r=H(s,m)$ and $K=G(s)$ using hash functions H and G, and computing the ciphertext as $C=(g^r, y^r*s, Enc(K,m))$, where Enc is a symmetric encryption algorithm.

To decrypt a ciphertext $C=(C\_1, C\_2, C\_3)$, the value $s= C\_2/C\_1^x$ is computed, $m=Dec(G(s), C\_3)$ is recovered, and check is performed to determine whether $C\_1=g^{H(s,m)}$. If so, the decryptor returns m; otherwise, it rejects the ciphertext.

In accordance with embodiments disclosed herein, proofs of equal discrete logarithms may be required. This may be accomplished, for example, as follows. Let g and h be two generators of the group G, let x be a secret exponent, and let $y=g^x$ and $z=h^x$. A prover who knows x can prove that y and z have equal discrete logarithms with respect to g and h (e.g., $\log\_g(y)=\log\_h(z)$) as follows. The prover chooses a random t from $Z\_q$ and computes the proof (c,s) as $c=H(g^t, h^t)$ and $s=xc+t \mod q$, where H is a hash function. To verify the proof (c,s) with respect to (g, h, y, z), the verifier checks that $c=H(g^s/y^c, h^s/z^c)$.

In accordance with one or more embodiments, multi-encryption may be performed through randomness recovery. This may be accomplished, for example, as follows. To send the same secret key x to multiple recipients with public keys $y\_1, \ldots, y\_n$, the sender may use ElGamal encryption with randomness recovery to encrypt x under each public key $y\_1$. However, the same randomness r may be reused for each recipient. The ciphertext is therefore $C=(C\_0=g^r, C\_1, \ldots, C\_n)$, which each recipient i can decrypt by decrypting $(C\_0, C\_i)$. Having recovered r in the process, the recipient i then checks that all recipients received the same key x by checking that $C\_j=y\_j^r*m$.

In accordance with one or more embodiments, multi-encryption may be performed through proofs of equal discrete logarithms. Alternatively, the sender of the key x may use proofs of equal discrete logarithms to show that he encrypted the same key to all recipients. This may be accomplished, for example, in the following manner. The sender chooses random r from $Z\_q$ and computes $C\_0=g^r$, $C\_1=y\_1^r*x$, $C\_n=y\_n^r*x$ together with a proof (c,s) that the discrete logarithm of $C\_0$ with respect to g is equal to that of $C\_i/C\_{i+1}$ with respect to $y\_i/y\_{i+1}$ for all $i=1, \ldots, n-1$. More specifically, the sender may choose a random t from $Z\_q$ and compute $c=H(g^t, (y\_1/y\_2)^t, (y\_{n-1}/y\_n)^t)$ and $s=rc+t \mod q$.

To decrypt a ciphertext $C=(C\_0, C\_1, \ldots, C\_n, c, s)$, the i-th recipient recovers $x=C\_i/C\_0^{x\_i}$ and verifies the proof of equal discrete logarithms by checking that $c=H(g^s/C\_0^c, (y\_1/y\_2)^t/(C\_1/C\_2)^c, \ldots, (y\_{n-1}/y\_n)^t/(C\_{n-1}/C\_n)^c)$.

Figure 5F:
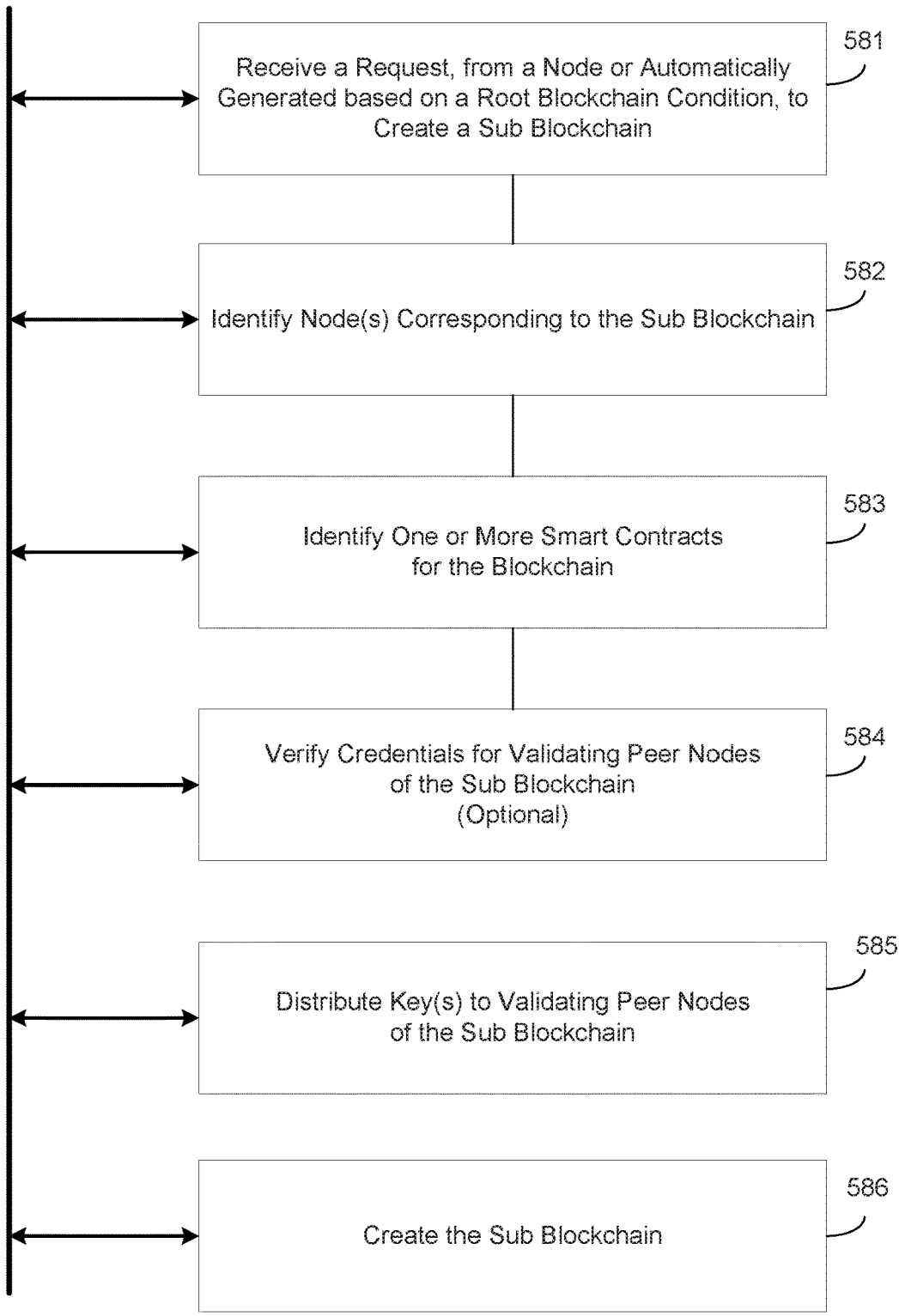
FIG. 5F illustrates a further flow diagram, according to example embodiments.

FIG. 5F illustrates another embodiment of a method 580 to trigger the creation of a sub blockchain through a blockchain transaction in the root network. The method 580 includes, at 581, an operation to receive a message or instruction to create a second (or sub) blockchain in a network that includes a first (or root) blockchain. The message may be sent by a validating peer or a different entity, e.g., an administrator or other management authority, application, or device.

In one case, the message may be triggered by a predetermined action with respect to the root blockchain. For example, the message may be automatically generated by the network processor when a certain type of block is appended to the root blockchain (as determined, for example, by execution of a smart contract), when a certain number of blocks have been appended to the root blockchain, and/or when one or more other conditions relating to the root blockchain are performed. The message may be received by the network processor, identity management infrastructure, or other network resource.

At 582, an operation is performed to identify one or more validating peer nodes in the network as corresponding to the sub blockchain. The validating peer nodes may correspond to a subset of nodes of the network that have access to the root blockchain. The validating peer nodes may be identified by the same entity providing the message or instruction to create the sub blockchain or may be made by a different entity, for example, based on a received message or instruction.

At 583, an operation is performed to identify one or more smart contracts or policy information to be used in controlling the network processor to create the sub blockchain, access or append blocks to the sub blockchain, and/or perform other features relating to management of the sub blockchain. The smart contracts may be stored in a network storage device, along with other smart contracts, policy information, applications, and/or other network-related information and data. As with all embodiments disclosed herein, the data for the root and sub blockchains may be stored in one or more network storage areas, or even in an off-chain storage device.

At 584, an operation is performed to verify credentials (e.g., trust assumptions, certificates, or other credentials) for the validating peer nodes of the sub blockchain. This operation may be omitted in some embodiments, e.g., when the credentials of the validating peer nodes have already been verified, for example, in association with access to the root blockchain.

At 585, an operation is performed to distribute different keys to respective ones of the validating peer nodes assigned to the sub blockchain. The keys may be, for example, one key (e.g., the private or secret key) of a key pair. In this case, the other (e.g., public key) may have already been sent to the validating peer nodes of the sub blockchain or may be sent with the private key.

At 586, an operation is performed to create the sub blockchain. The sub blockchain may store data that is related to or different from the data of the root blockchain. Only the validating peer nodes that have been assigned to the sub blockchain may access the sub blockchain. At this point, corresponding nodes may begin submitting requests for transactions in accordance with the associated smart contract(s).

Figure 6A:
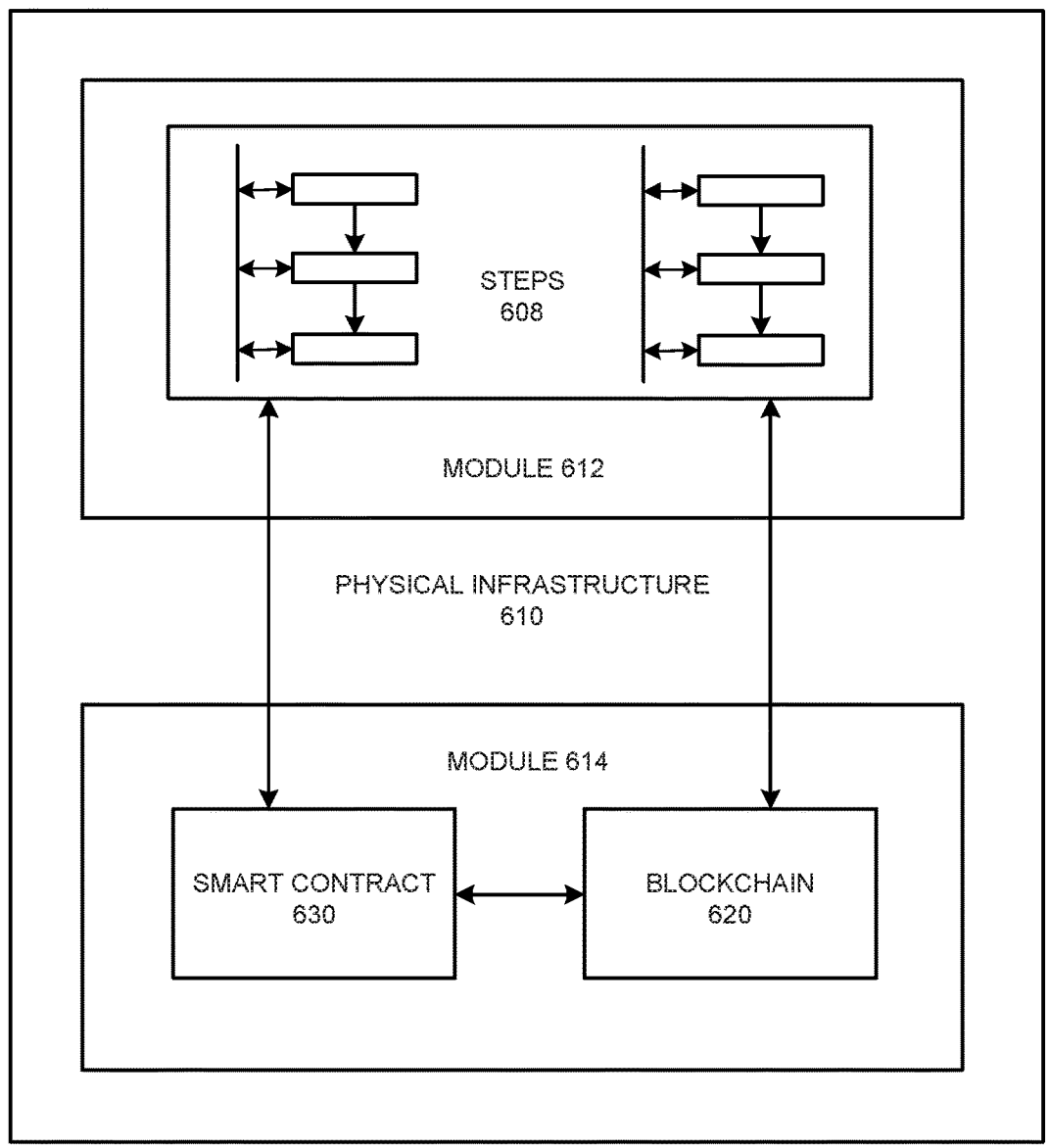
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
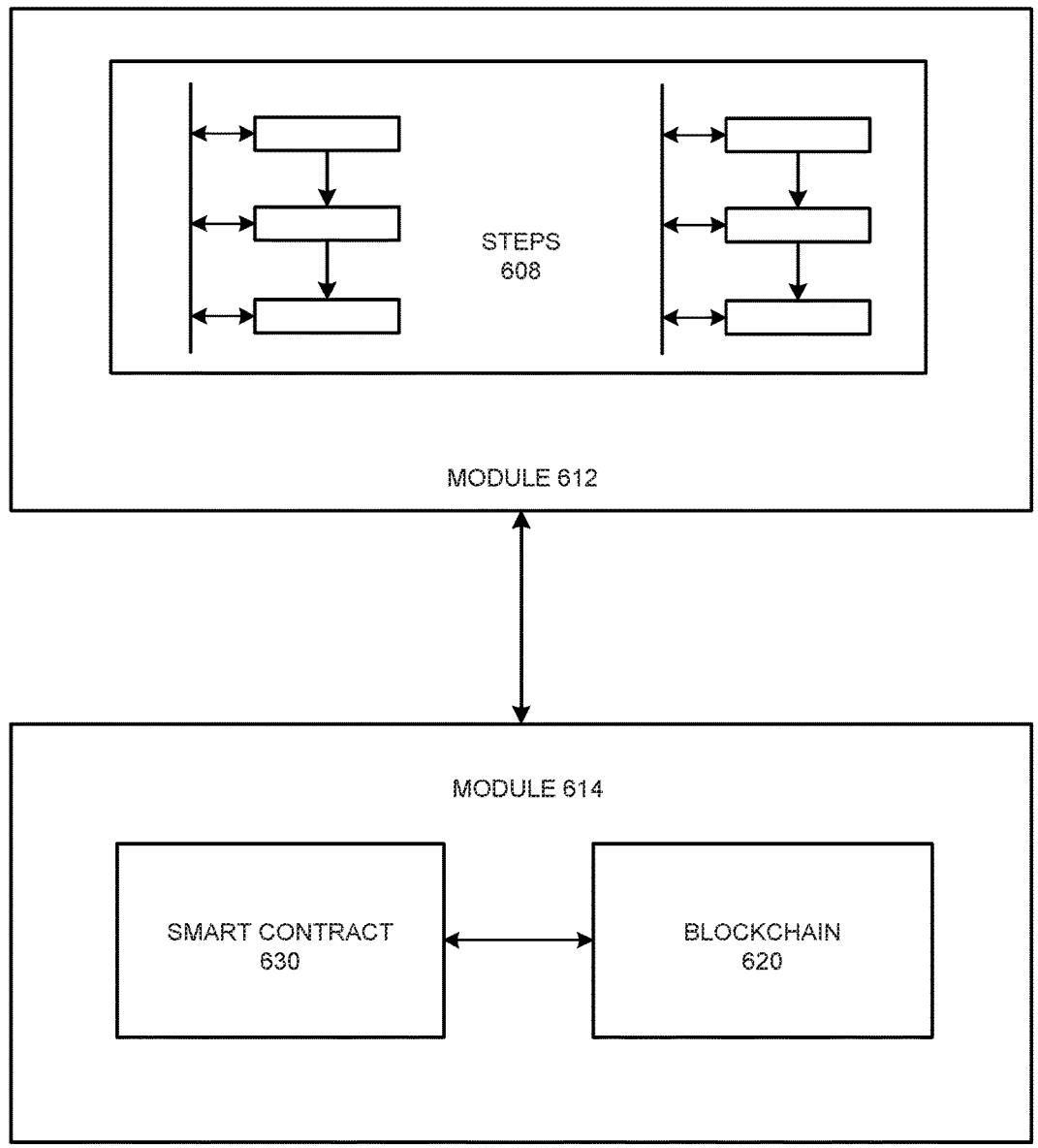
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
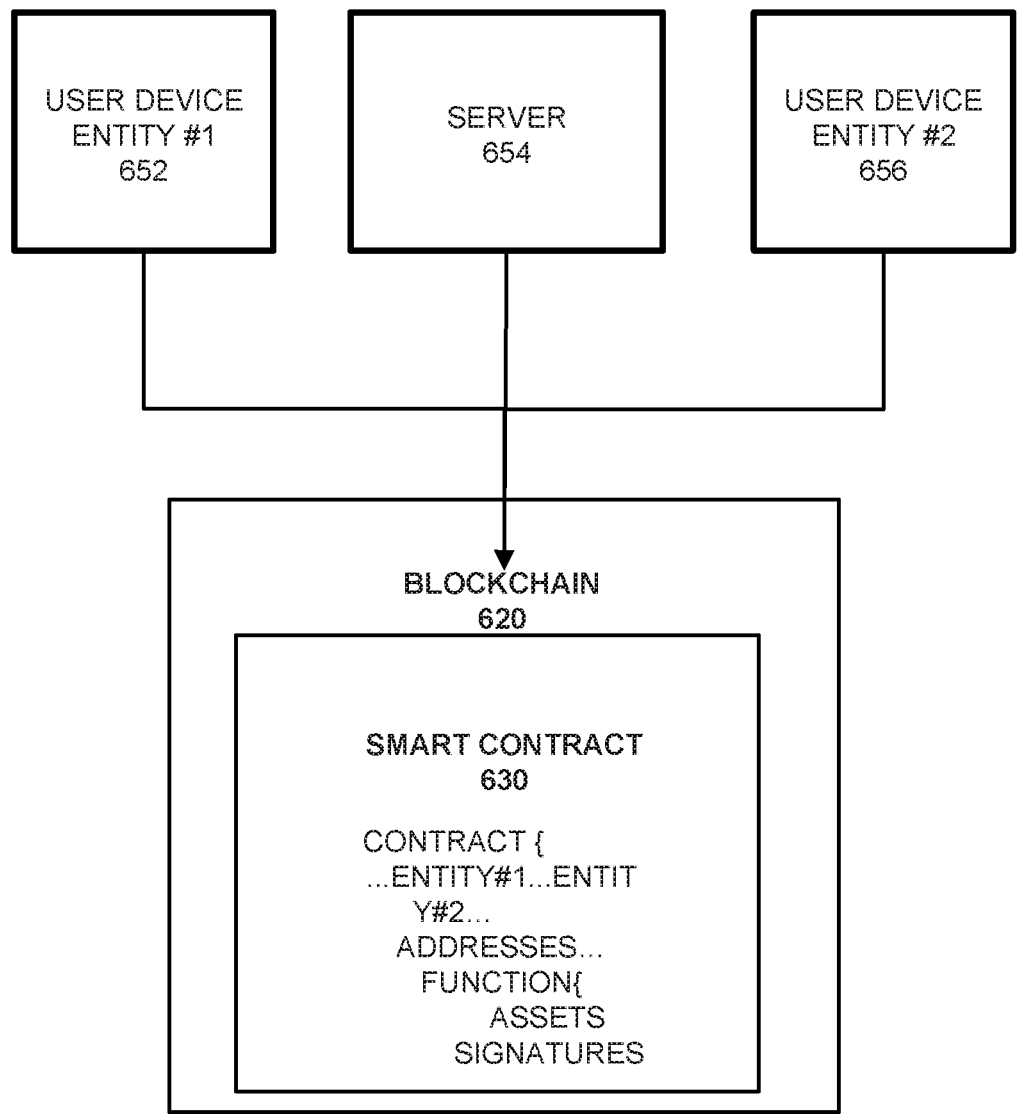
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
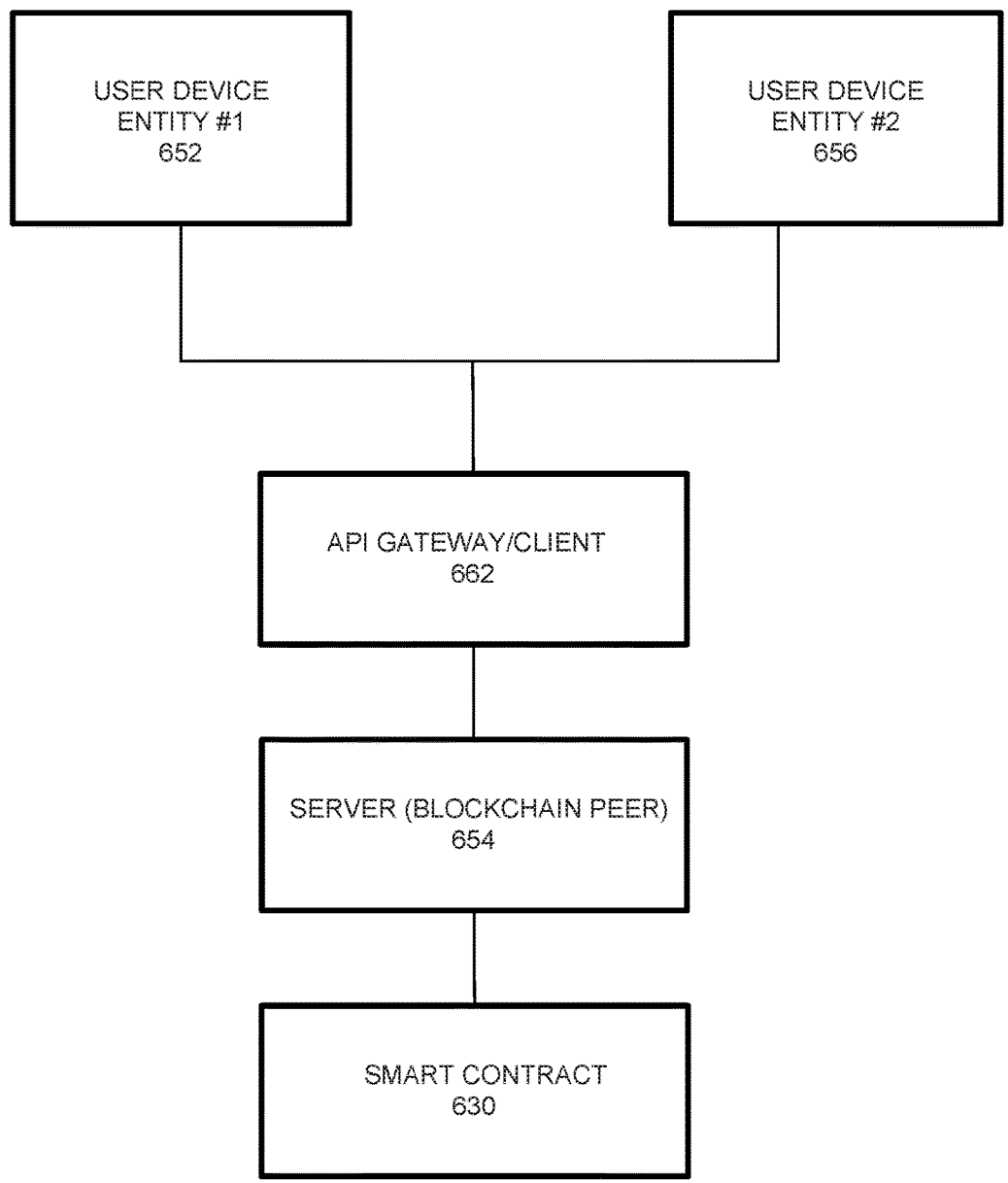
FIG. 6D illustrates another an additional example system, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
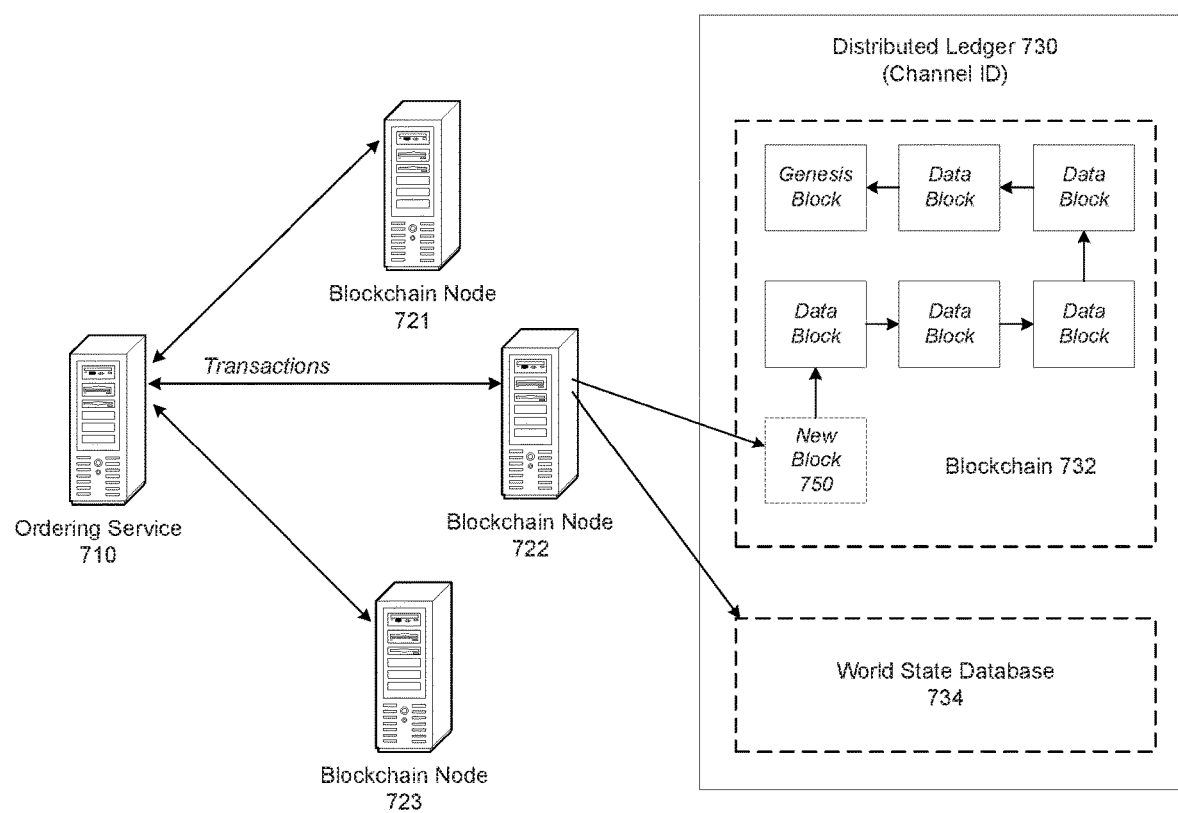
FIG. 7A illustrates a process of new data being added to a database, according to example embodiments.
Figure 7B:
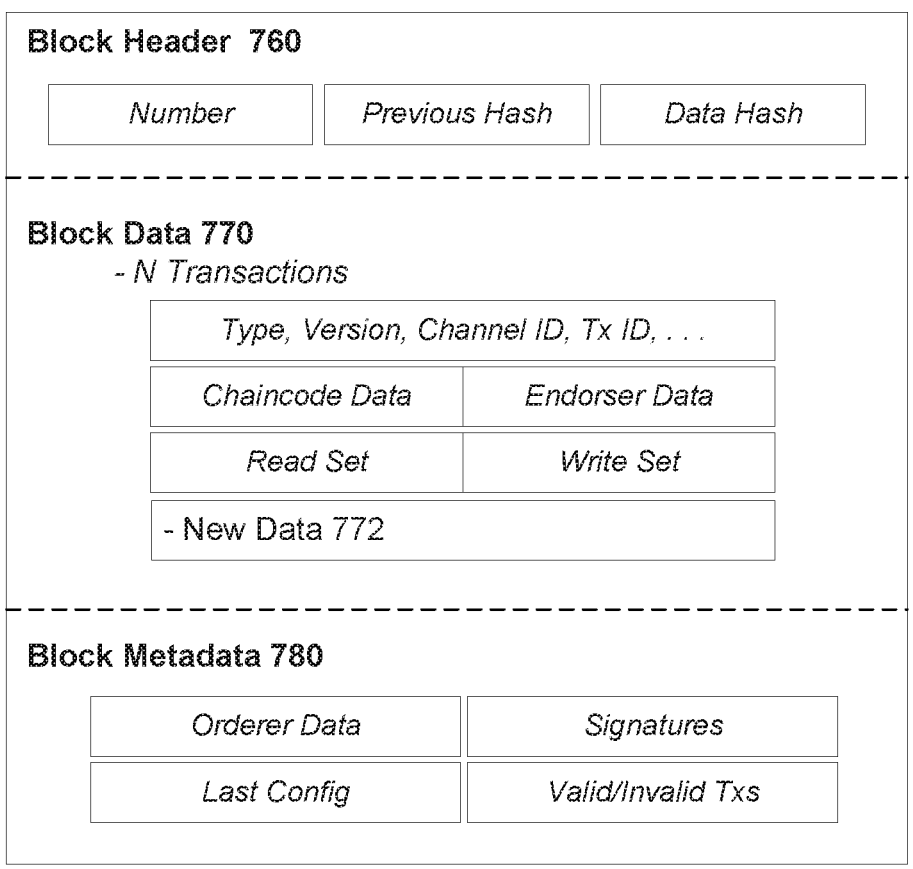
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
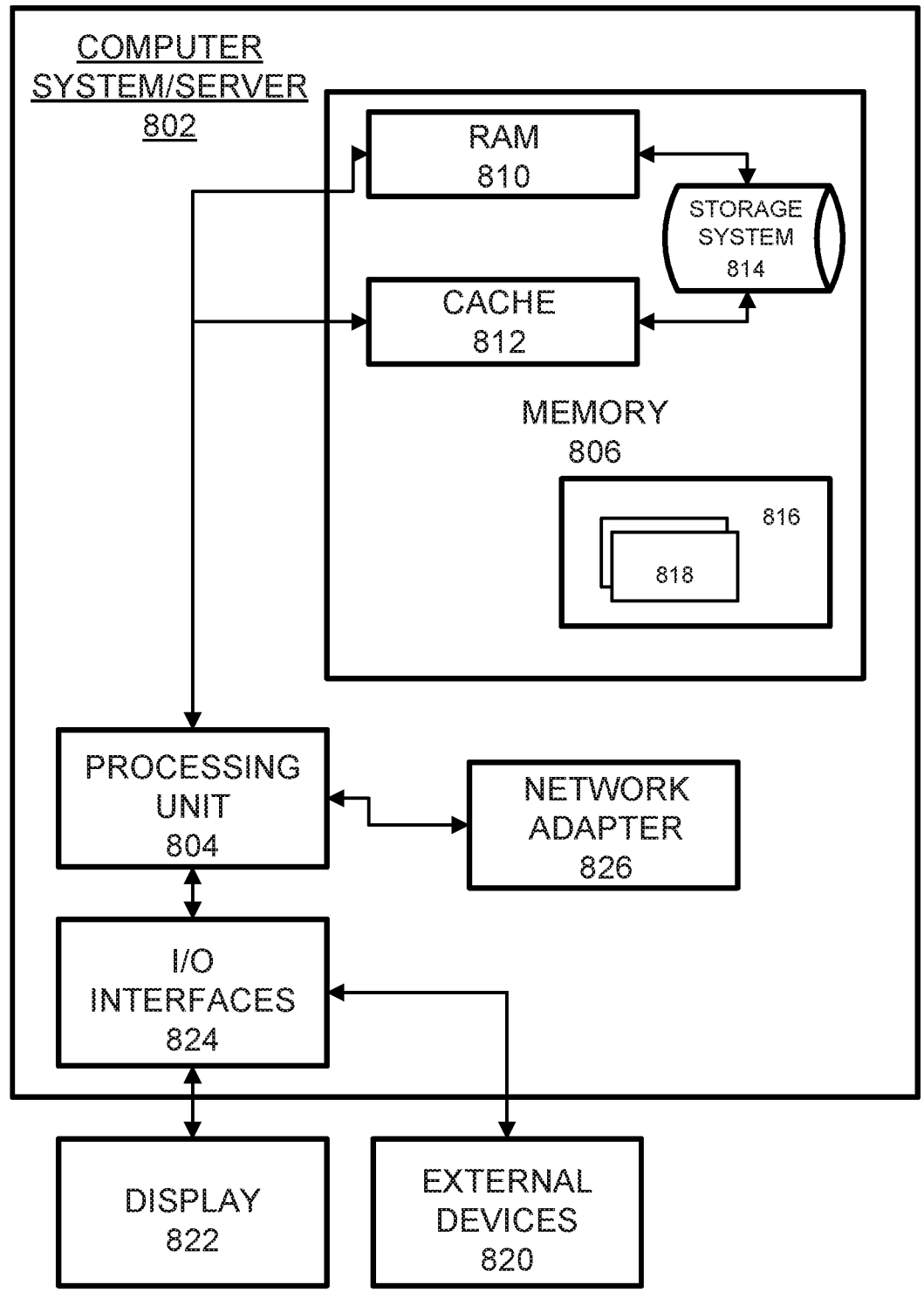
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
   a first interface to access a ledger of first blockchain in a blockchain network, the first blockchain to include or reference first data to be accessed by a plurality of validating peer nodes;
   a second interface to access a ledger of second blockchain in the blockchain network, the second blockchain to include or reference second data to be accessed by a subset of the plurality of validating peer nodes that have access to the first blockchain; and
   a processor to;
   create the second blockchain based on a message from a validating peer node, of the subset of the plurality of validating peer nodes, the message including information that identifies the subset of the plurality of validating peer nodes, and
   send one or more keys to the subset of the plurality of validating peer nodes, the one or more keys to allow the subset of the plurality of validating peer nodes to access the second data in the second blockchain or to transmit information to append a block to the second blockchain.

2. The system of claim 1, wherein the processor further is to:
   create the second blockchain when a predetermined number of the validating peer nodes in the subset authorize creation of the second blockchain.

3. The system of claim 1, wherein the processor further is to:
   create the second blockchain based on instructions in a smart contract.

4. The system of claim 1, wherein the processor further is to:
   send the one or more keys in a certificate sent to each of the validating peer nodes in the subset.

5. The system of claim 1, wherein the processor further is to:
   exclude access to the second blockchain by validating peer nodes of the network that are not in the subset.

6. A method, comprising:
   receiving a request to create a second blockchain in a network that includes a first blockchain;
   sending a message to one or more validating peer nodes in the network, the one or more validating peer nodes corresponding to a subset of validating peer nodes of the network that have access to the first blockchain, the message requesting authorization for the second blockchain;
   analyzing responses to the message from the subset of validating peer nodes; and
   authorizing creation of the second blockchain based on the analyzed responses.

7. The method of claim 6, wherein the request includes information that identifies the subset of validating peer nodes of the network.

8. The method of claim 6, wherein the request includes a reference to a smart contract for the second blockchain.

9. The method of claim 8, wherein the smart contract includes instructions to create the second blockchain.

10. The method of claim 9, wherein the smart contract includes instructions to submit transactions to the second blockchain.

11. The method of claim 6, wherein the request includes key material to be used by the subset of validating peer nodes to transmit or receive information or messages for the second blockchain.

12. The method of claim 11, further comprising:
transmitting different private keys to respective ones of the validating peer nodes in the subset,
wherein the private keys are to be used with a public key in the key material when the subset of validating peer nodes submit transactions for the second blockchain.

13. The method of claim 12, further comprising:
preventing access to the second blockchain to validating peer nodes in the network that are not included in the subset of validating peer nodes.

14. The method of claim 13, wherein preventing access includes:
withholding submission of a key to the validating peer nodes in the network that are not included in the subset of validating peer nodes.

15. The method of claim 6, further comprising:
transmitting a certificate to each validating peer node in the subset of validating peer nodes,
wherein the certificate includes key material to be used by the subset of validating peer nodes to transmit or receive information or messages for the second blockchain.

16. The method of claim 6, wherein:
analyzing the responses includes determining a number of the subset of validating peer nodes that authorized creation of the second blockchain, and
authorizing creation of the second blockchain includes creating the second blockchain when a predetermined number of the subset of validating peer nodes authorize creation of the second blockchain.

17. The method of claim 6, wherein:
the first blockchain stores or references first data; and
the second blockchain stores or references second data different from the first data.

18. A non-transitory computer-readable medium storing one or more instructions that when executed by a processor cause the processor to:
receive a request to create a second blockchain in a network that includes a first blockchain;
send a message to one or more validating peer nodes in the network, the one or more validating peer nodes corresponding to a subset of validating peer nodes of the network that have access to the first blockchain, the message to request authorization for the second blockchain;
analyze responses to the message from the subset of validating peer nodes; and
authorize creation of the second blockchain based on the analyzed responses.

19. The computer-readable medium of claim 18, wherein the request includes information that identifies the subset of validating peer nodes of the network.

20. The computer-readable medium of claim 18, wherein the request includes a reference to a smart contract that includes instructions to create the second blockchain.

* * * * *